United States Patent [19]

Stein

[11] Patent Number: 6,130,668
[45] Date of Patent: Oct. 10, 2000

[54] SUPERVISORY CONTROL SYSTEM FOR NETWORKED MULTIMEDIA WORKSTATIONS THAT PROVIDES SIMULTANEOUS OBSERVATION OF MULTIPLE REMOTE WORKSTATIONS

[75] Inventor: Michael Victor Stein, San Jose, Calif.

[73] Assignee: Apple Computer, Inc., Cupertino, Calif.

[21] Appl. No.: 08/280,341

[22] Filed: Jul. 25, 1994

[51] Int. Cl.[7] ................................ G06F 13/00
[52] U.S. Cl. .............................. 345/302; 345/329
[58] Field of Search .................... 395/153, 131, 395/139; 434/336, 350, 352; 345/153, 431, 439, 302, 329

[56] References Cited

U.S. PATENT DOCUMENTS

| | | | |
|---|---|---|---|
| 4,715,818 | 12/1987 | Shapiro et al. | 434/350 |
| 4,907,146 | 3/1990 | Caporali | 364/132 |
| 4,974,173 | 11/1990 | Stefik et al. | 395/153 |
| 5,002,491 | 3/1991 | Abrahamson et al. | 434/336 |
| 5,176,520 | 1/1993 | Hamilton | 434/350 |
| 5,211,563 | 5/1993 | Haga et al. | 434/322 |
| 5,241,625 | 8/1993 | Epard et al. | 395/163 |
| 5,263,869 | 11/1993 | Ziv-El | 434/336 |
| 5,294,998 | 3/1994 | Piovoso et al. | 358/428 |
| 5,295,836 | 3/1994 | Ryu et al. | 434/350 |
| 5,318,450 | 6/1994 | Carver | 434/336 |
| 5,327,509 | 7/1994 | Rich | 395/131 |
| 5,418,894 | 5/1995 | Kitamura et al. | 395/131 |

FOREIGN PATENT DOCUMENTS

| | | |
|---|---|---|
| 10279558 | 8/1988 | European Pat. Off. . |
| 10547536 | 6/1993 | European Pat. Off. . |
| 3940051A1 | 6/1990 | Germany . |

OTHER PUBLICATIONS

Brochure from Toei Industries, Tokyo, Japan, entitled "School AV Network System", no date given.
Brochure from IDK, Inc., Japan, entitled "Educational Visual Network System", no date given.

Primary Examiner—Mark Zimmerman
Assistant Examiner—Lance W. Sealey
Attorney, Agent, or Firm—Burns, Doane, Swecker & Mathis, L.L.P.

[57] ABSTRACT

A supervisory control system for a networked multimedia computing system includes an observation feature which enables a teacher, or other supervisory person, to observe a reduced view of multiple workstations at one time. The teacher is provided with a good representation of the entirety of each of the multiple screens, which enables the teacher to comprehend the type of subject matter currently being viewed by the student. If a particular student's screen is of interest, the teacher can readily select that student's screen and obtain a full-sized view thereof. In this mode, the teacher also has the option to control the student's workstation. If the number of students selected for observation is greater than the number of screens that can be presented at one time, the observation function cycles through groups of compressed screens, to permit the teacher to view all students of interest.

30 Claims, 18 Drawing Sheets

FIG. 17

SUPERVISORY CONTROL SYSTEM FOR NETWORKED MULTIMEDIA WORKSTATIONS THAT PROVIDES SIMULTANEOUS OBSERVATION OF MULTIPLE REMOTE WORKSTATIONS

FIELD OF THE INVENTION

The present invention is directed to a system of networked computer workstations that are particularly suited for use in classroom and other instructional types of environments, and more specifically to a system for enabling an administrator to monitor and control individual workstations within the network.

BACKGROUND OF THE INVENTION

With the increased processing power available on desktop computers and the expanding use of various types of media to present information, computer systems have been developed which combine these two technologies in a network that can selectively distribute audio-visual information from any of a number of sources to individual workstations on the network. Examples of such systems are disclosed in commonly assigned, copending U.S. patent application Ser. Nos. 08/207,779 and 08/207,957, filed Mar. 8, 1994, the disclosures of which are incorporated herein by reference. Generally speaking, the systems disclosed in these applications comprise a number of multimedia workstations and a plurality of audio-visual sources that are connected to one another over two parallel networks. A multichannel A/V network delivers audio-visual information from the sources to the various workstations. A digital data network transmits data and control information between the various workstations, as well as from the workstations to the audio-visual sources.

An arrangement of this type offers a number of features that are particularly useful in classrooms and other educational environments. For example, a teacher can make an announcement to any number of selected students, and can carry on a two-way conversation with any given student. The teacher and the students can watch videos from a multiplicity of different sources, and the teacher can remotely control individual student workstations to receive the video information from a particular source. The teacher is provided with the ability to observe student workstations, as well as to control the operation of any particular workstation. For further information regarding the details of such a system, reference is made to the previously cited patent applications.

The present invention is particularly directed to functions that can be performed at a master workstation on a network of this type. Typically, in a classroom environment the master workstation is controlled by the teacher. In other environments, such as in a business office setting, the master workstation might be under the supervision of a system administrator, or the like.

In a typical classroom or computer laboratory setting, it is desirable to enable the teacher to observe the operations being performed at individual students' workstations. To this end, screen sharing applications have been employed in the past, to permit the teacher to view the same information as that presented on the display monitor of an individual student's workstation, and thereby observe the tasks being carried out by the student. To permit the teacher to observe all of the students in the classroom, or at least some number of them, the application can continuously cycle from one student's display to the next, with a suitable dwell time to permit the teacher to quickly observe the subject matter on the student's screen. It will be appreciated that, in a large classroom, it can take a considerable amount of time to cycle through all of the students' workstations.

To permit the teacher to observe more than one workstation at a time, at least one screen sharing application provides the ability to display a portion of four different remote workstations on the teacher's monitor. In this mode of operation, a portion of one student's screen is displayed in a window at the upper left quadrant of the teacher's monitor, a portion of another student's screen is displayed in a window on the upper right quadrant of the teacher's monitor, and so on for two other student's screens. While this arrangement allows the teacher to observe more than one student at a time, it only gives the teacher partial insight into each of the student's activities. As such, it may not provide the teacher with all relevant information. For example, if the teacher is observing the upper left quadrant of a student's screen, but the student is working with an object located in the lower right portion of the screen, the teacher will not be able to observe the operations being performed by the student without scrolling or resizing a window to show the relevant portion of the student's screen. Accordingly, it is desirable to provide a supervisory system which enables the teacher to observe multiple students at a time, while still giving the teacher an adequate representation of the operations being performed by each student.

In another aspect of these types of systems, the teacher may desire to configure students' workstations to operate in a particular manner. This operation can be carried out by replacing the operating system for a workstation with an updated version thereof. In the past, this type of operation was carried out by physically installing a bootable, removable disk on each workstation, and transferring system software from the removable disk to permanent storage within the workstation. It can be appreciated that in a setting such as a computer laboratory, where a large number of computers are present, the need to physically install the system software on each computer can be quite burdensome and time-consuming. It is desirable to provide an approach in which student workstations can be reconfigured, through the updating of system software, without the need to manually install the software on each individual computer.

Further along these lines, the teacher may desire to open a predetermined document at each workstation for the students to work on, for example at the beginning of a class period. In the past, if the students did not previously store the document at the same location on each of their workstations, it was not possible to open the documents on all of the workstations at one time with a single command from the teacher's workstation. Rather, each student workstation had to be individually accessed by the teacher to open the document. It is desirable to provide a facility by which a document can be opened on any selected workstation with a single command from the teacher's workstation.

To facilitate interaction between the teacher and the students, networked computer systems may include a facility to permit individual students to request attention from the teacher. For example, by entering a particular keystroke combination or selecting a command from a menu, the student can transmit a request for attention from his or her workstation to that of the teacher. The teacher is then prompted to respond to the student's request. When multiple students request attention, the teacher might be provided with a prompt for each individual student. However, no priority is assigned to the various requests. As a result, the teacher might respond to them in a random fashion, unrelated to the order in which they were presented. Consequently, an individual student might have to wait for an unacceptably long period of time before receiving a response to a request for attention.

BRIEF STATEMENT OF THE INVENTION

The present invention provides a supervisory control system for a networked multimedia computing system that addresses the foregoing limitations associated with currently existing systems, and that provides additional features which facilitate the use and control of the networked system. In one aspect of the invention, an observation feature is provided which enables a teacher, or other supervisory person, to observe a reduced view of multiple workstations at one time. The teacher is provided with a good representation of the entirety of each of the multiple screens, which enables the teacher to comprehend the type of subject matter currently being viewed by the student. If a particular student's screen is of interest, the teacher can readily select that student's screen and obtain a full-sized view thereof. In this mode, the teacher also has the option to control the student's workstation. If the number of students selected for observation is greater than the number of screens that can be presented at one time, the observation function cycles through groups of compressed screens, to permit the teacher to view all students of interest.

These and other features of the present invention, and the advantages offered thereby, are explained in detail hereinafter with reference to specific embodiments illustrated in the accompanying drawings.

BRIEF DESCRIPTION OF THE DRAWINGS

FIG. 17 is another illustration of the master control window, showing pending requests for attention;

DETAILED DESCRIPTION

To facilitate an understanding of the present invention, its features are described hereinafter with reference to a particular implementation, namely a multimedia computer network that is designed for a classroom or computer laboratory environment, in which a teacher operates a master workstation and students are located at a multiplicity of other workstations. It will be appreciated, however, that the practical applications of the invention are not limited to this particular environment. Rather, it will be found to have utility in any situation in which a designated administrator or supervisory person has control over a defined set of computer workstations. For example, it might be employed in a business office, where a system administrator controls networked workstations of various office personnel.

Figure 1:
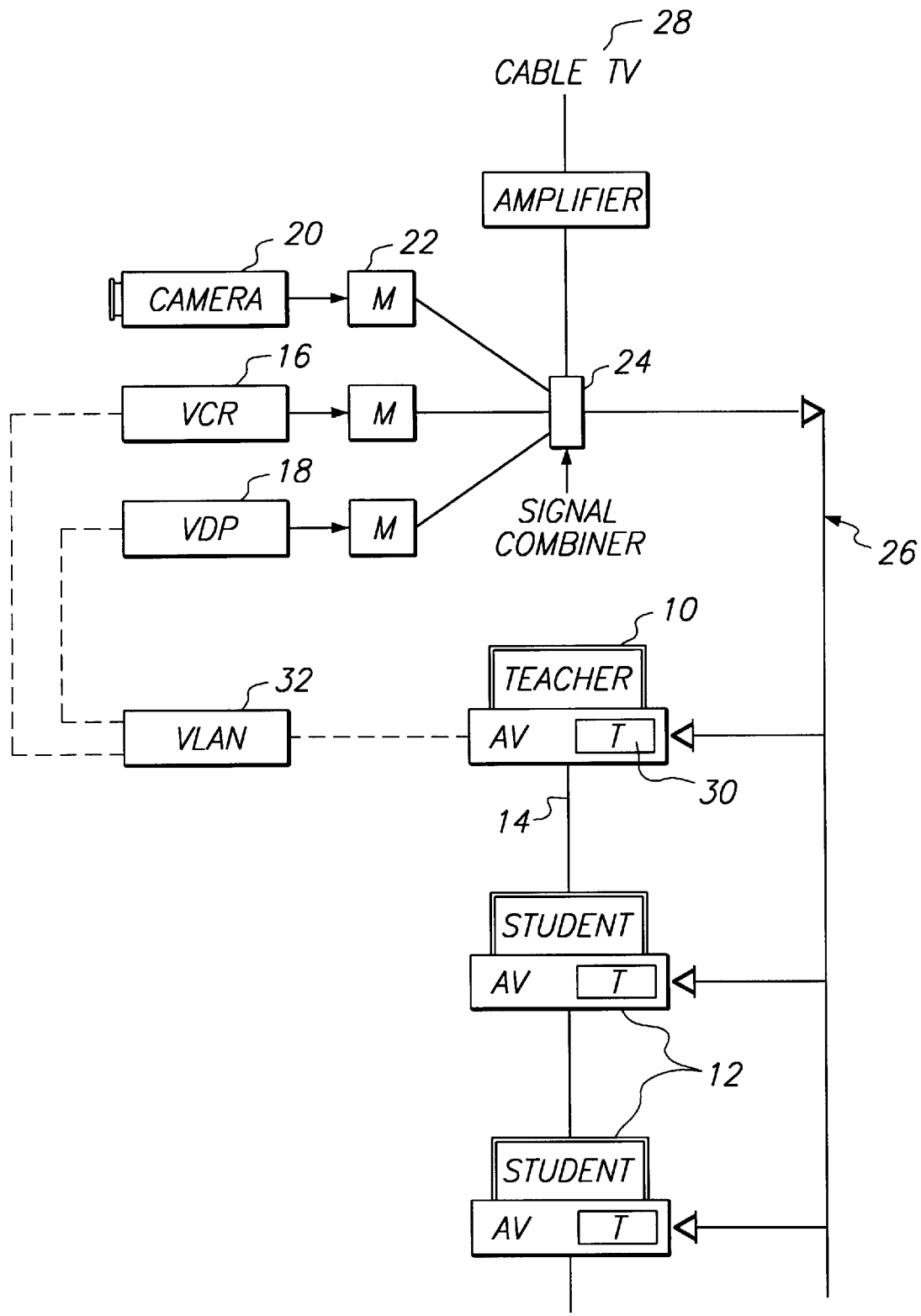
FIG. 1 is a block diagram of the hardware architecture of a networked computer system of a type to which the present invention can be applied.

One example of a hardware configuration for a networked multimedia system of the type to which the present invention applies is illustrated in FIG. 1. Referring thereto, the system contains a number of workstations, including a master workstation 10 at the disposal of the teacher, and a multiplicity of other workstations 12 that are accessible to the students. Each workstation includes a central processing unit (CPU) with associated memory, some form of permanent storage, such as a hard disk or read-only memory (ROM), and a monitor which provides a display screen for viewing the work being performed at the workstation. In a typical classroom or laboratory setting, all of the workstations might be located in one room. In other settings, however, the workstations can be located in different rooms, and possibly different buildings.

The various workstations are connected to one another by means of a suitable conventional data network 14, for example an Ethernet network. This network enables digital data to be exchanged between the various workstations. Examples of this digital data include digitized audio information, which permit the students and the teacher to communicate with one another, as well as screen data which enables the information presented on the screen of one workstation to be displayed on the monitors of other workstations.

Also included within the system are a plurality of audio-visual (AV) sources. In the particular example illustrated in FIG. 1, the AV sources include a video cassette recorder 16, a video disk player 18 and a video camera 20. Each of these sources is connected to an associated modulator 22, and the signals from the modulators are presented to a signal combiner 24. Analog video information from each of the video sources is distributed to the various workstations, through the signal combiner 24, by means of a multifrequency network 26. This multifrequency network can be a CATV network, for example. In operation, the analog video information from each of the sources is amplified and translated into a television channel signal by their respective modulators 22. These signals are combined and distributed to the workstations on respective television channels, via the combiner 24 and the network 26. In addition to the discrete sources, the network 26 can also be connected with a commercial cable television service 28, an antenna and/or a satellite dish, to provide additional television signals. Utilizing this approach, well over one hundred different channels of information can be sent to each workstation.

Each workstation is provided with a television tuner 30. Through control provided locally at the student's workstation or remotely from the teacher's workstation, these tuners can select a particular channel for transfer into an audio-visual subsystem of the workstation. The audio-visual subsystem converts the analog video and audio information into suitable signals that are processed within the workstation and presented on its display.

A video network controller 32 is connected to the master workstation 10, to permit the teacher to control the individual video sources. This controller allows the teacher to send control commands to the various video devices, such as start, stop, fast forward, etc. These commands are provided to the individual video devices through a suitable remote control interface.

At each workstation, a student can choose a video source such as a cable network or a local device, select a particular television channel, and select an audio device (not shown). To remotely control any of these devices, a student's workstation 12 can send a request to the teacher's workstation 10, which then communicates with the video network controller 32, to transmit control signals to the video device. A suitable arbiter can be employed to prevent more than one user from controlling a video device at a time.

For further information regarding the details of a system of the type illustrated in FIG. 1, reference is made to the previously cited patent applications.

Figure 2:
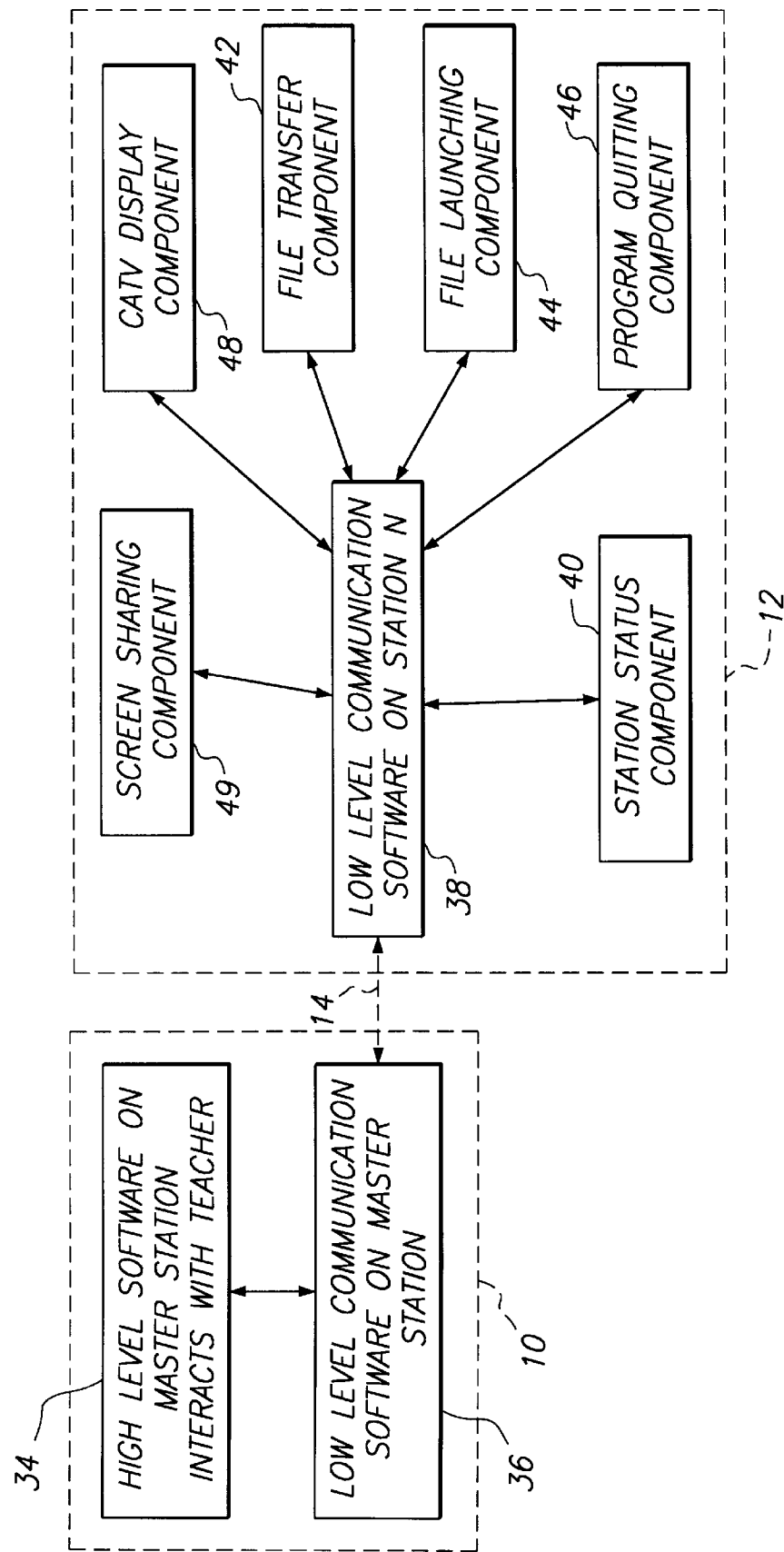
FIG. 2 is a block diagram of the software architecture for such a system.

The architecture of the software for performing these functions, as well as additional functions described hereinafter, is illustrated in block diagram form in FIG. 2. Referring thereto, the software located on the teacher's workstation 10 permits the teacher to interact with the various student workstations, controlling their video displays and handling audio communications. This software can be classified into two main parts. High level software 34 interacts with the teacher, permitting him or her to issue the commands for controlling the student's workstations. Low level communication software 36 communicates these commands to the various student workstations over the digital data network 14.

Each of the student workstations 12 also includes low level communication software for handling communications between the teacher and the student over the digital data network. In response to commands received over the digital data network from the master workstation, various other software components are called to perform certain tasks. A station status component 40 reports the current status of the workstation, when prompted by the master workstation. A file transfer component 42, a file launching component 44, and a program quitting component 46 respectively handle the receipt, launching and termination of documents and applications on the student's workstation, in response to commands from the master workstation. A CATV display component 48 provides a television display for the student's workstation. It also permits the student to capture video information, and control remotely located video devices connected to the teacher's workstation. A screen sharing component 49 processes data pertaining to the information being displayed on the student's screen, and furnishes this data to the master workstation 10. One example of a suitable screen sharing application is the Timbuktu product developed by Farallon Computing, Inc. of Alameda, Calif.

In the operation of the system, the students carry out tasks on their respective workstations 12, such as creating a document, designing a graphical image, viewing a video presentation, and the like. All of the students can be working on the same project, or each might be performing an individual task. From the master workstation 10, the teacher can observe the subject matter on each student's monitor screen, as well as control the information provided to selected workstations or even control the operation of the workstation. To carry out these functions, the teacher is presented with a main control display or window, an example of which is illustrated in FIG. 3.

Figure 3:
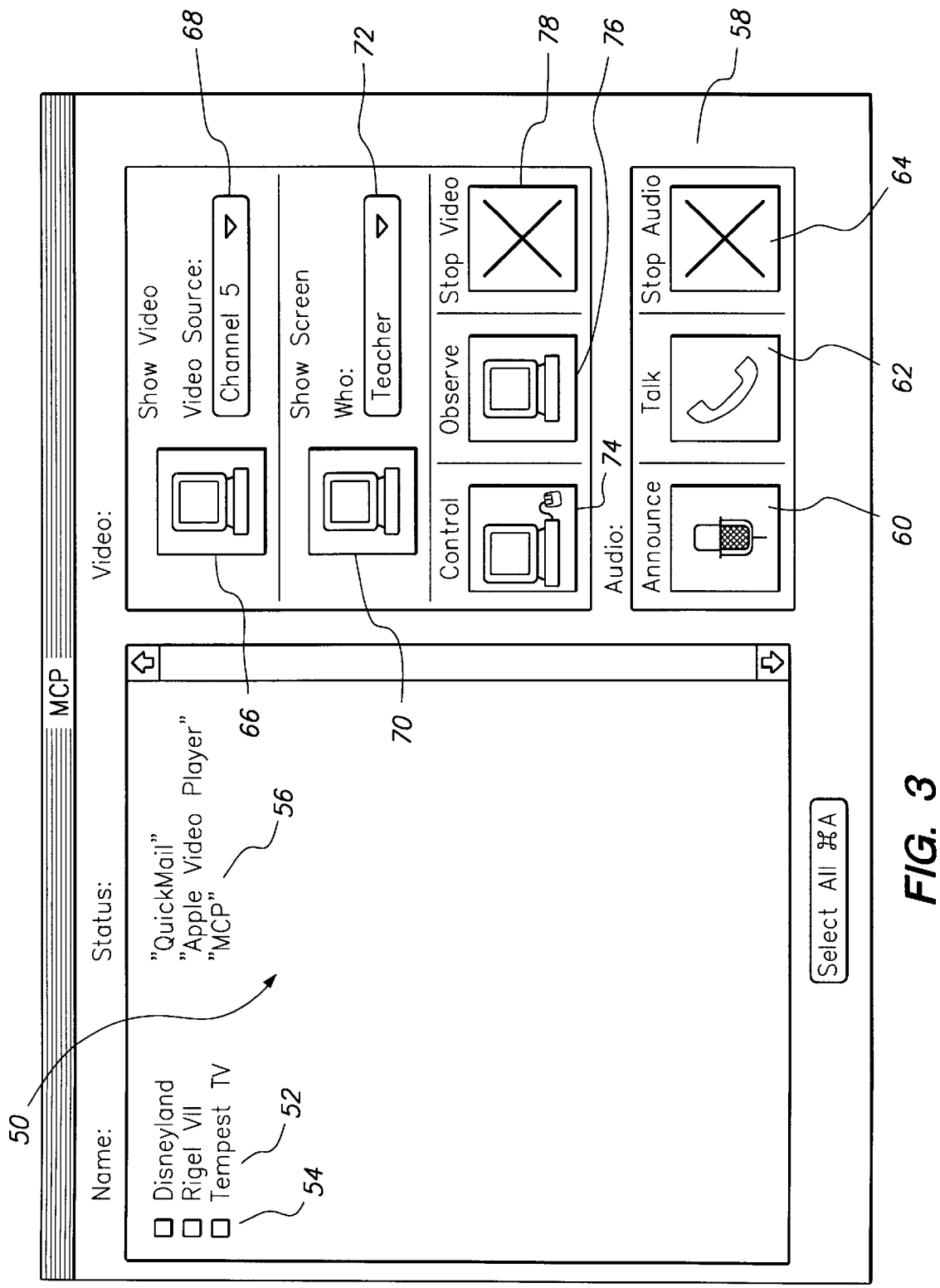
FIG. 3 is an illustration of the main control window that is presented at a master workstation.

Referring to FIG. 3, the main control window is divided into three primary areas. A status area 50 provides a list of the workstations on the network that have the basic control program installed on them. In the particular example of FIG. 3, there are three such workstations listed according to names 52 that are assigned to each station. Adjacent each name is an indicator box 54 that identifies whether the user at that station has requested attention, as explained in greater detail hereinafter. To the right of each name is a status field 56 which indicates the information that is currently being displayed at the respective workstation. For example, if the student is viewing a particular video channel or observing a different student's workstation, that information will be displayed in the status field. Otherwise, the status field can identify the application program that is currently running on the workstation.

A second area of the main control window comprises an audio area 58. This area contains three buttons that can be activated by the teacher. An announce button 60 enables the teacher to make audio announcements to one or more students who are designated by selecting them in the status area 50 of the window. After selecting the appropriate workstations and activating the announce button 60, the teacher speaks into a microphone at his or her workstation to provide a one-way communication that can be used to explain material to students, for example.

A talk button 62 operates in a similar manner, except that it permits a two-way conversation to be carried out between the teacher and a single selected student. In carrying out either of the announce or talk functions, the sounds spoken into the microphones at the teacher's and student's workstations are digitized at the originating workstation and then transmitted to the receiving workstation over the digital data network 14, where they are converted to analog signals and played back over speakers or headphones associated with that workstation.

A stop audio button 64 is actuated to terminate the audio command at each selected workstation.

The third area of the main control window comprises a video area. This area contains five user-actuated control buttons. A show video button 66 forces selected workstations to watch a given channel that is designated via a pop-up menu 68. At the selected workstations, the television display program 48 is launched, and causes the incoming video on the designated channel to fill the entire screen.

A show screen button 70 causes the screen at a designated workstation, identified in a pop-up menu 72, to be displayed at the selected workstations. When this button is actuated, the screen sharing application 50 at the designated workstation captures the screen information for that workstation and transmits it via the digital data network 14. At the selected workstations, the screen sharing program receives this information and causes it to be displayed, in lieu of the screen drawing information being generated at that workstation.

A control button 74 enables the teacher to control a selected student's workstation. When this button is actuated, the screen sharing program at the selected workstation captures the screen information and transmits it to the teacher's workstation, where it fills the teacher's entire screen. Keystrokes and cursor actions that are input at the teacher's workstation are transmitted to the selected workstation, so that both the selected workstation and the teacher's workstation are controlled by the teacher. A close box on the teacher's screen (not shown) allows the teacher to return to the main control window of FIG. 3. Actuation of this close box automatically terminates the control function.

Figure 4:
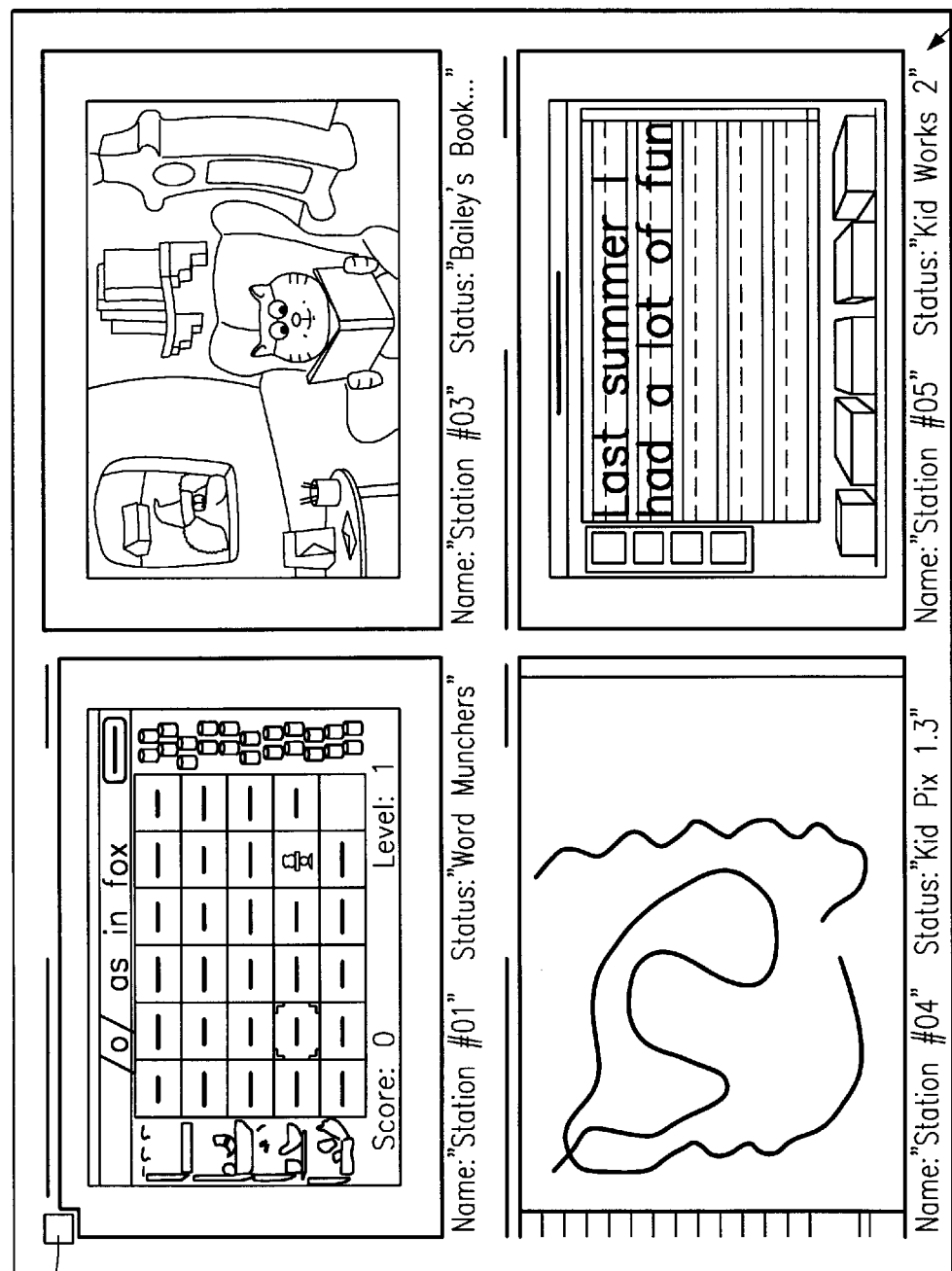
FIG. 4 is an illustration of a master workstation display screen during the observation of screens on four remote workstations.

An observe button 76 allows the teacher to view the screens at selected workstations. If only one workstation is selected, the screen from that workstation will be reproduced at the teacher's workstation in full size, so that it covers the teacher's entire screen. If more than one workstation is selected for observation, the selected workstations are grouped in sets of four. The screens for all of the workstations in a group are shown simultaneously on the teacher's screen, with each display being compressed to 25% of its original size. FIG. 4 illustrates an example in which the screens of four designated workstations are shown on the screen simultaneously, with each screen appearing in one quadrant of the teacher's screen. At the bottom of each screen is a status line 77 which identifies the station and the program currently running on that station.

If more than four workstations are selected, the system continually cycles through the various groups, with each group being displayed for a predetermined period of time that can be adjusted by the teacher. Thus, if five workstations are selected by the teacher, the first four are presented as one group, as depicted in FIG. 4, and then the fifth workstation is presented by itself as the sole member of a second group. If desired, when a group consists of only one workstation, its screen can be shown in a full-size format, rather than compressed.

The compression of the screen information to produce the reduced display is carried out at the selected workstations, prior to transmission to the teacher's workstation over the digital data network 14. The compression can be achieved by translating the pixels of the selected workstation's screen into RGB color space and performing a linear decimation function on the component colors. To do so, the pixels of the selected workstation's screen are divided into groups of four adjacent pixels that form 2×2 matrices. The red color component values for the four pixels in a group are summed and then divided by four. The same procedure is carried out for the green and blue components of the four pixels. The resulting values determine the RGB color space value for one corresponding pixel in the compressed screen format. This information is used to control the display in one of the quadrants of the teacher's screen.

By performing the compression operation at the student's workstations, the master workstation's load is decreased, and it is therefore better able to keep up with the information continually being provided by the remote workstations. Also, since a compressed amount of data is sent over the digital data network, less network bandwidth is required than when full-size information is transmitted from multiple workstations. Furthermore, by sending data relating only to true or primary colors, i.e. red, green and blue, any disparities between color palettes on the different students' workstations are avoided at the master workstation.

It has been found that a 4:1 compression ratio provides the teacher with a good representation of the student's screen. While small font text may not be clearly readable, larger graphical elements such as icons and windows are readily discernable, as well as digital videos that may be playing on the student's screen. Using the foregoing approach, it is possible to provide a greater amount of compression, e.g. 9:1 or 16:1, to permit the teacher to observe a larger number of students' workstations at one time.

If one particular student's workstation is of interest, the teacher can click on the display for that workstation, and cause it to expand to a full size display. For example, clicking in the upper left quadrant of the screen would send a command to the workstation whose screen is being displayed in that quadrant, causing its screen sharing program to send the screen information in a non-compressed format. If desired, this action can also permit the teacher to take over control of the workstation.

Figure 5:
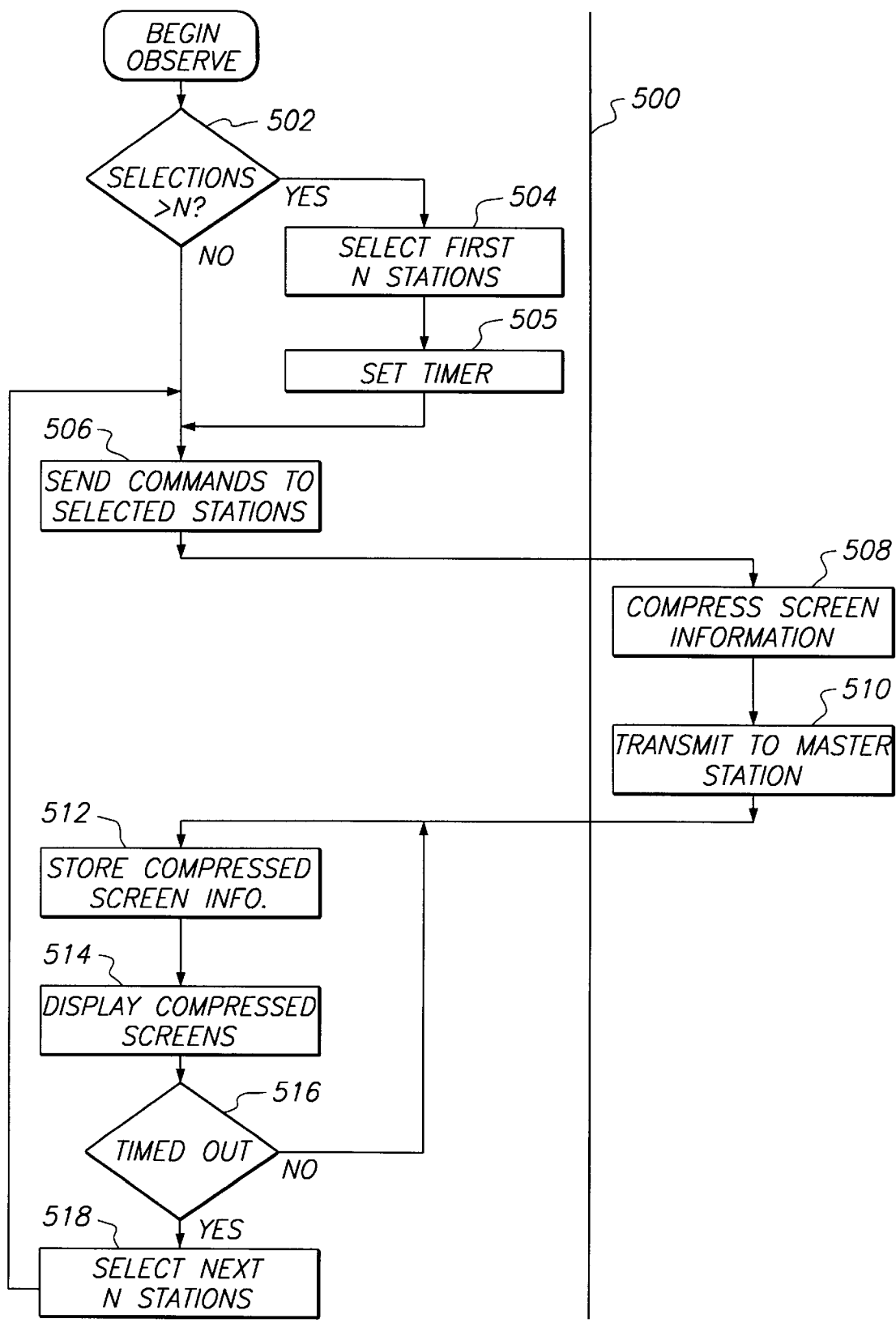
FIG. 5 is a flowchart of the overall operation for displaying multiple screens at the master workstation.

FIGS. 5–8 are flowcharts which illustrate the process for observing screens at the teacher's workstation. The flowchart of FIG. 5 depicts the overall operation that is carried out in response to the observe command. In this flowchart, functions depicted on the left side of a vertical line 500 are performed at the teacher's workstation, while those on the right side are carried out at the respective student workstations. When the teacher actuates the observe button 76, the system first determines, at Step 502, whether the number of selected student workstations is greater than a predetermined number N. This number is equal to the number of student screens that can be displayed on the teacher's screen at one time. In the example of FIG. 4, it is equal to four. If more than N workstations have been selected, the first N stations are chosen at Step 504, and a timer is set at Step 505. A command is then sent to the chosen workstations to send compressed screen information (Step 506). In response to receipt of this command, each workstation processes pixel data relating to the information being currently displayed on its screen, to produce compressed-screen data (Step 508). This compressed-screen data is then transmitted to the master station 10 (Step 510), where it is stored in a buffer associated with that workstation (Step 512). Once all of the compressed-screen data is received from the chosen workstations and stored, it is displayed on the teacher's monitor at step 514, as shown in FIG. 4.

After all of the screens are displayed, the timer is checked at Step 516. In a practical implementation, this timer can be checked as part of a background process that runs on the master workstation. If the timer has timed out, the next group of N workstations is chosen at Step 518, and they are commanded at Step 506 to send compressed screen information. If the timer has not timed out, or if no more than N stations have been originally selected by the teacher, the workstation continues to receive updated screen information and refresh its display.

Figure 6:
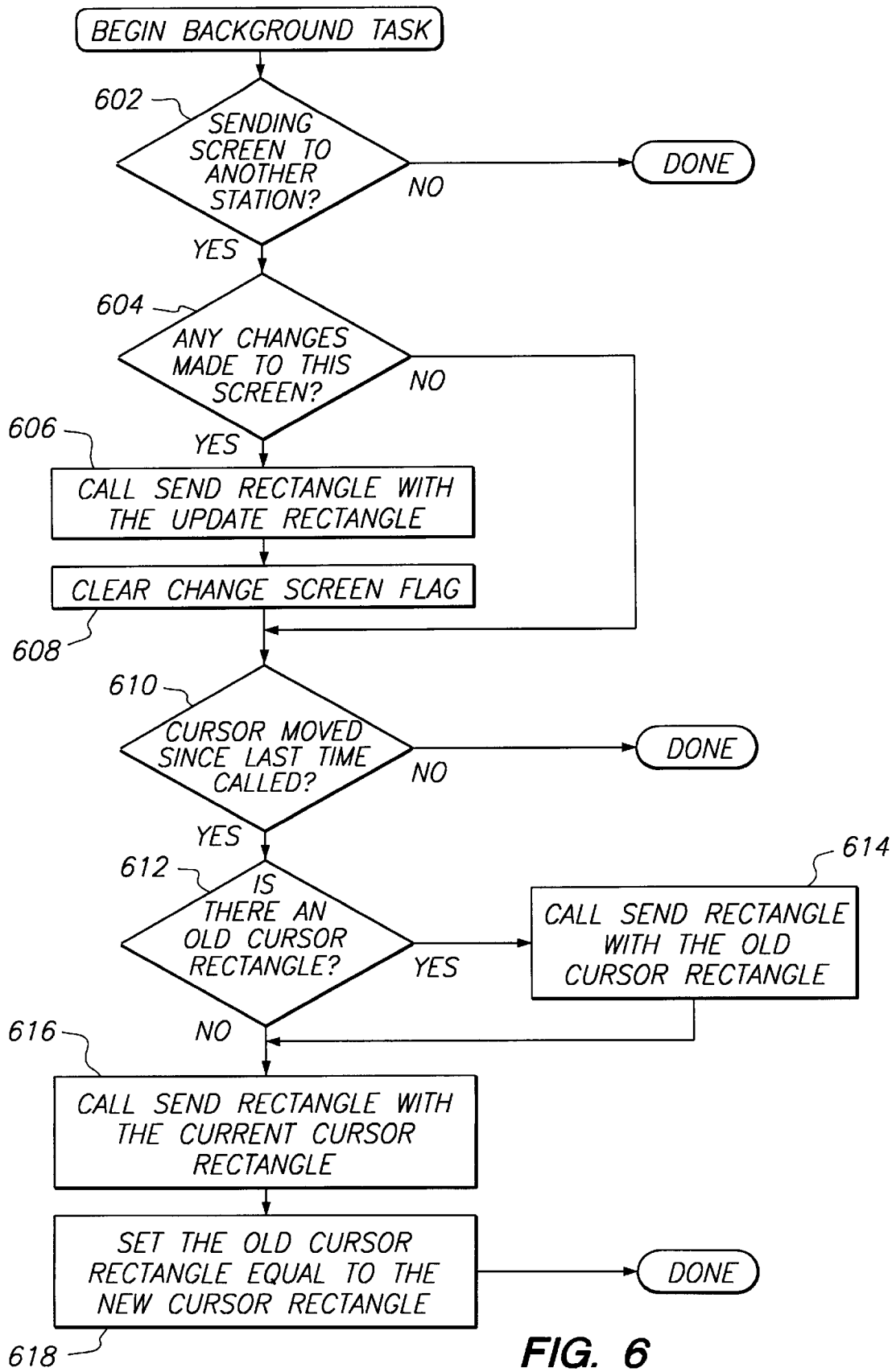
FIG. 6 is a flowchart of the background task that runs at the student workstation to display screen information.

Referring now to FIG. 6, a background process which runs on the student's workstation is shown. This process is periodically called by the workstation's operating system, when time is available for it to run. When it is called, the process first determines, at Step 602, whether the workstation is currently operating to send its screen to another workstation. For example, a flag can be set when the master workstation 10 instructs the student's workstation to send its screen information. At Step 602, the process can check the status of this flag. If the screen information is not currently being sent to another workstation, the process terminates. Conversely, if screen information is being sent, the process proceeds to Step 604, where a determination is made whether any changes have occurred on the screen since the last time information was sent. If so, a routine Send Rectangle is called at Step 606. This routine carries out the process of sending a part of the screen to the teacher's workstation, and is illustrated in greater detail in FIG. 7A.

In the process of sending screen information from one workstation to another, it is only necessary to send the information which changes from one cycle to the next. In the context of the disclosed embodiment, changed information is processed within a rectangle that encompasses all of the changes which occur during a given cycle. Thus, if the entire screen changes, the rectangle would encompass the whole screen. Conversely, if only a single word in a document is changed, the rectangle might be only large enough to encompass that word. If further changes are made, the rectangles which encompass these additional changes are added to the original rectangle, to form one rectangle that encompasses all changes.

Figure 7A:
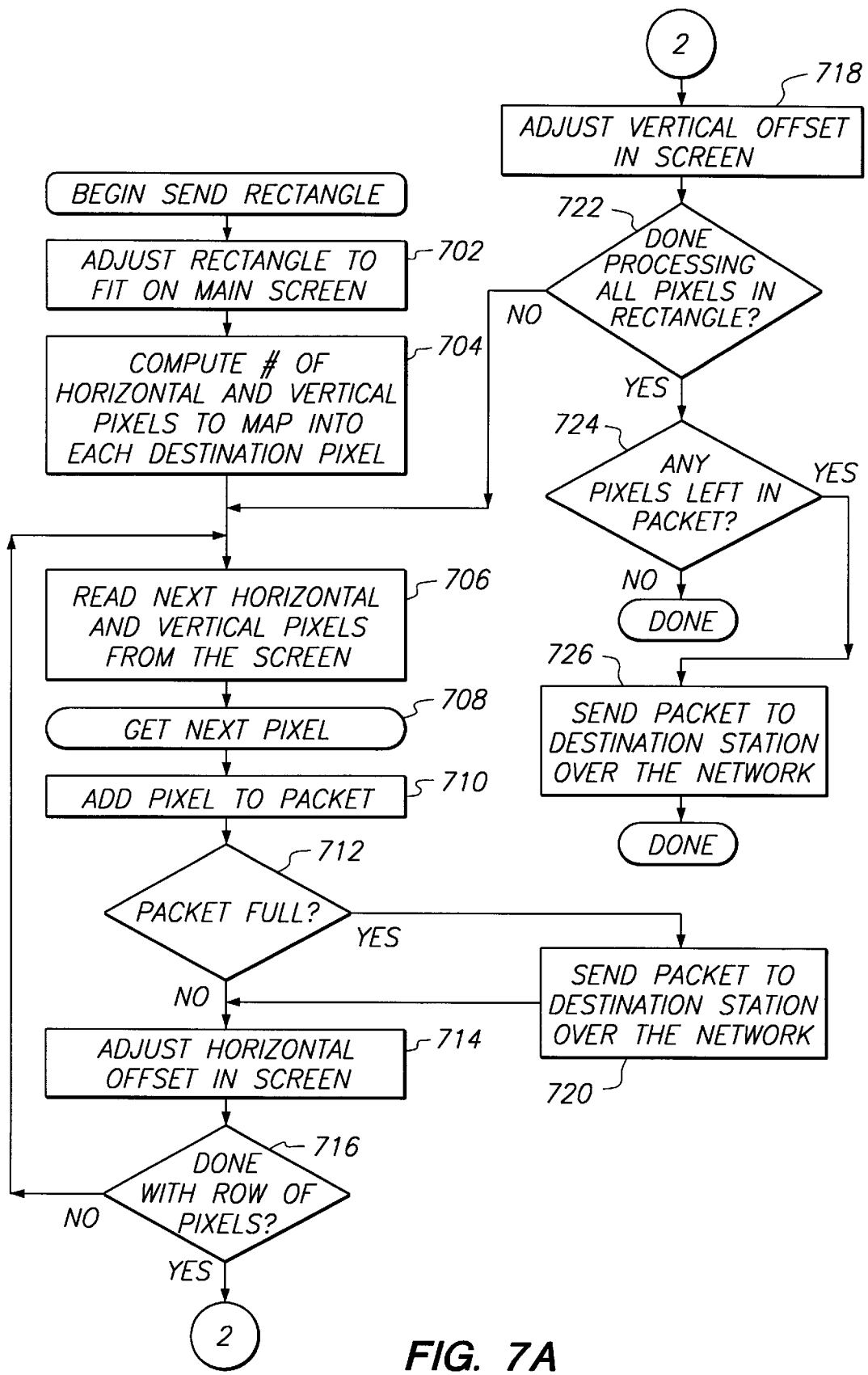
FIG. 7A is a flowchart of the Send Rectangle routine.

Referring now to FIG. 7A, when the Send Rectangle routine is called, it first determines a rectangle that fits on the screen of the student's workstation and encompasses all changes (Step 702). Then, at Step 704, the number of horizontal and vertical pixels to map into each destination pixel on the teacher's screen is computed. For a 4:1 compression ratio, this results in two horizontal and two vertical pixels. At Step 706, the values for the first group of four pixels are read, and a routine Get Next Pixel is then called at Step 708.

Figure 7B:
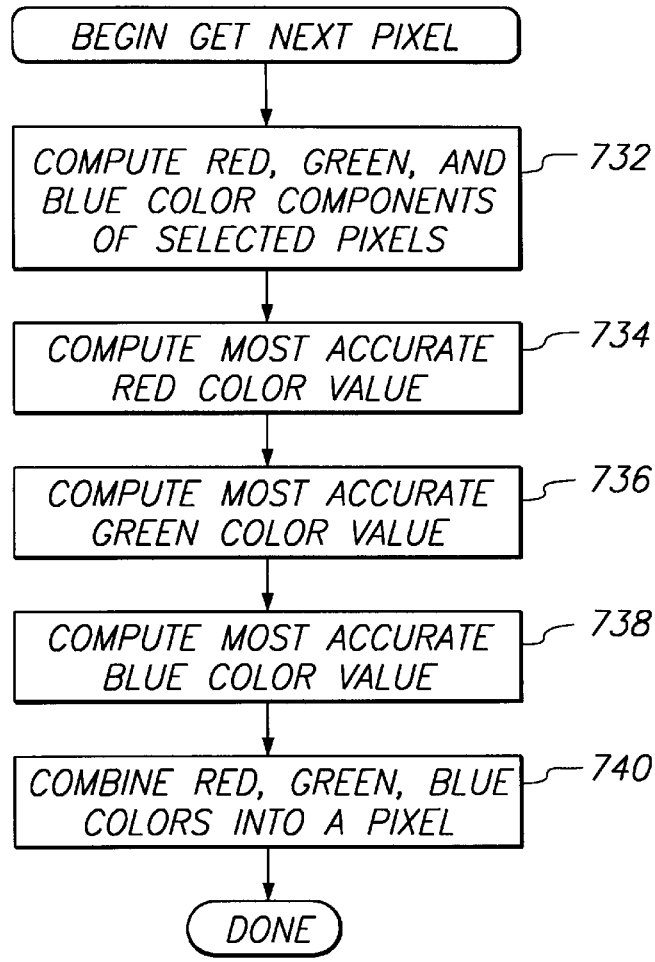
FIG. 7B is a flowchart of the Get Net Pixel routine.

This routine determines the value for the destination pixel, and is depicted in the flowchart of FIG. 7B. Referring thereto, at Step 732 the red, blue and green color components of the selected pixels are determined. At Steps 734, 736 and 738, the most accurate red, green and blue color values for the destination pixel are computed, for example by means of the linear decimation function described previously. At Step 740, these values are combined to form a color value for the destination pixel. For example, they might be combined to form a 16-bit pixel value.

Returning now to FIG. 7A, the pixel value returned from the Get Next Pixel routine is added to a packet to be transmitted to the master workstation 10 (Step 710). The process then moves to a new location on the screen at Step 714, as determined by the horizontal offset computed in Step 704, to select the next group of pixels. This procedure continues until all of the pixels in a row of the rectangle have been processed in this manner (Step 716). At that time, a new row of pixels is selected at Step 718, whose location is determined by the vertical offset computed in Step 704. The procedure continues until the packet is full (Step 712), at which time it is transmitted to the master workstation via the digital data network 14 (Step 720). Additional packets of data are created and transmitted in this manner, until all of the pixels in the rectangle have been processed (Step 722). At that time, if there is any pixel data in the final packet it is transmitted to the master workstation 10 (Steps 724 and 726), and the routine then terminates.

Returning now to the flowchart of FIG. 6, after the Send Rectangle routine has completed its operation, a change screen flag is cleared at Step 608, and the process proceeds to Step 610, where a determination is made whether the cursor has moved since the last time the process was called. If not, the process terminates. If the cursor has moved, the process checks at Step 612 whether a cursor rectangle has been previously created. Typically it will have, and so the process proceeds to Step 614 where the routine Send Rectangle is called, with information regarding the previous cursor rectangle. The effect of this operation is to replace the display of the cursor at the teacher's workstation with background color, to indicate that the cursor has moved away from its previous location. Thereafter, at Step 616, the Send Rectangle routine is again called with information pertaining to the new cursor location, so that the cursor is displayed at the proper location on the teacher's workstation. In Step 618, the old cursor rectangle is set to be equal to the new cursor rectangle, to thereby update the information regarding the new position of the cursor.

Figure 8:
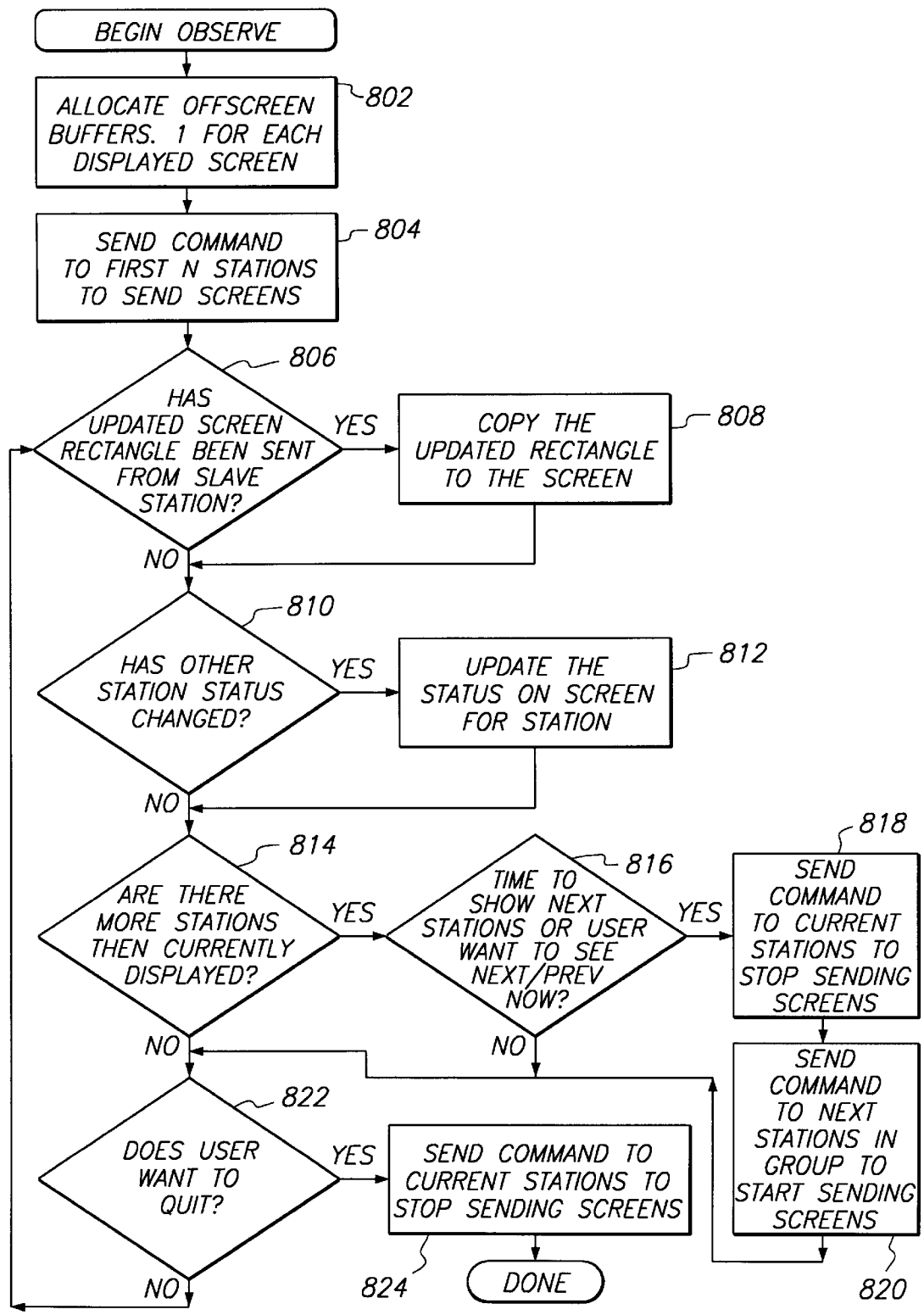
FIG. 8 is a flowchart of the observe operation that is performed at the master workstation.

FIG. 8 illustrates the procedure that is carried out at the teacher's workstation to observe multiple students' workstations. In response to selection of the students' workstations and actuation of the observe button 76, the operating system allocates one screen buffer for each selected workstation to be displayed (Step 802). The packets of pixel data that are transmitted from the respective workstations are stored in these buffers. The first group of machines are then instructed to send their screen information (Step 804), and this information is displayed. At Step 806, the system monitors the transmissions from the various workstations and determines whether any of those currently being displayed has sent updated screen rectangle information since the last check. If so, this information is copied to the screen at Step 808.

Thereafter, the system determines whether the status information for any of the machines has changed (Step 810). If so, the status information appearing in the line 77 at the bottom of the appropriate compressed screen display is updated (Step 812).

A determination is then made, at Step 814, whether there are additional workstations to be displayed, e.g. the teacher has selected more than four stations. If so, a timer is checked to see if it is time to switch to the next group of stations (Step 816). When the appropriate amount of time has elapsed, a command is sent to the currently displayed machines to stop sending screen information (Step 818), and the next group of workstations are instructed to begin sending screen information (Step 820).

This process continues until the teacher indicates that the observation mode of operation is no longer desired (Step 822), for example by clicking on a close button 79 (FIG. 4). At this time, a command is sent to the currently displayed machines to stop sending screen information.

Referring again to FIG. 3, a stop video button 78 can be actuated by the teacher to cancel the video command being executed on selected workstations, such as show screen or show video.

In addition to the main control window illustrated in FIG. 3, the teacher is provided with a menu of commands (not shown) that permit the teacher to carry out other tasks on the network. Some of these commands pertain to administrative functions by which the teacher can set up and maintain the networked system. For example, these functions can include the naming of the individual workstations, and the designation of audio-visual devices and their associated television channels.

Figure 9:
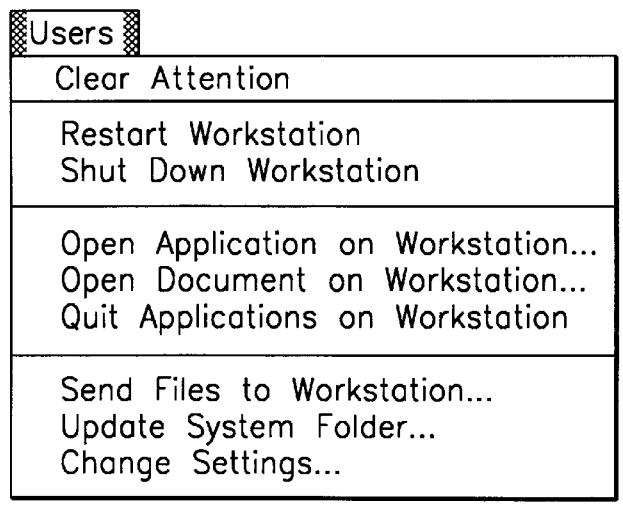
FIG. 9 is an illustration of a menu that is displayed at the master workstation to control operations at student workstations.
Figure 10:
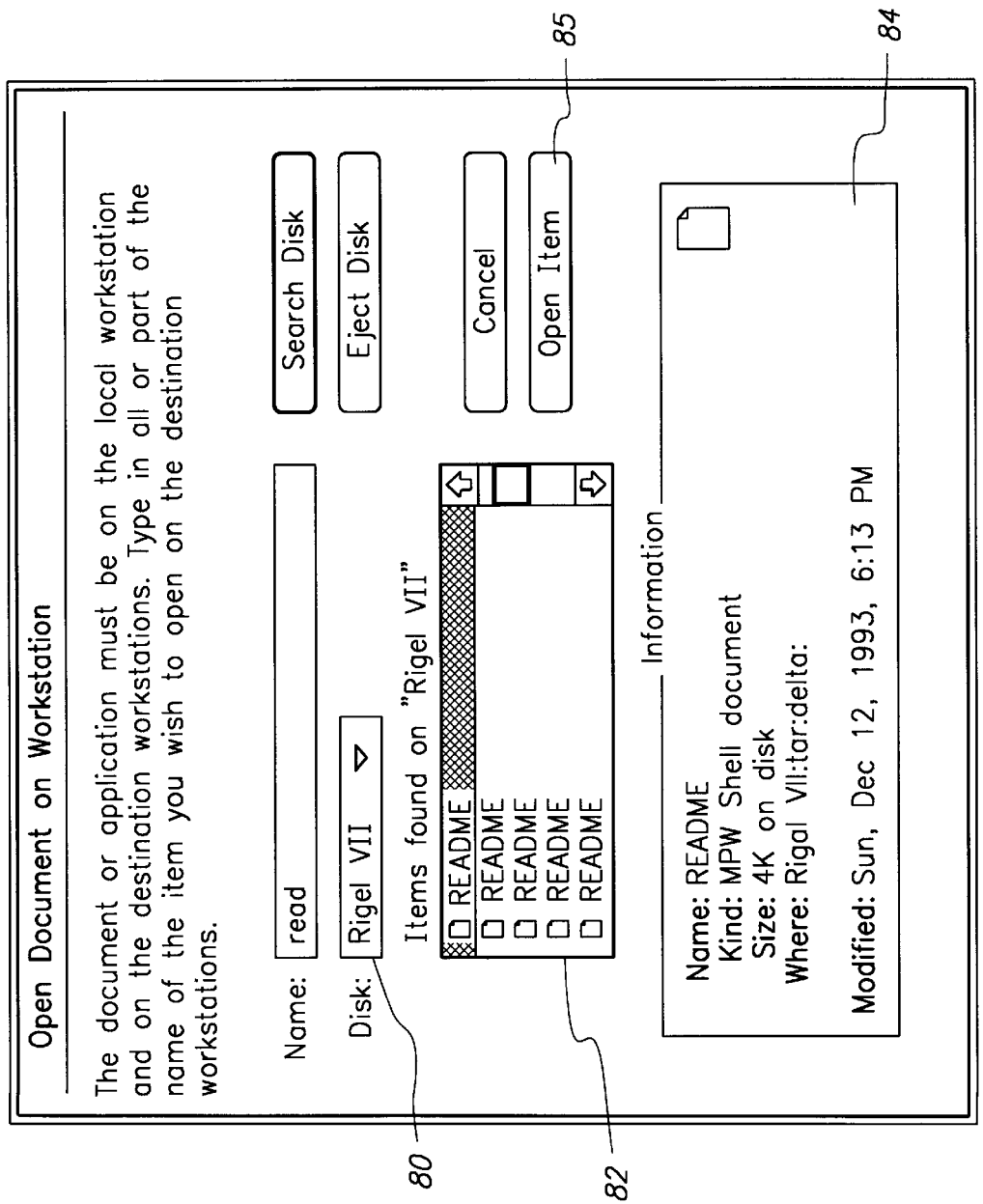
FIG. 10 is an illustration of a dialog box for the open document function.

Another set of commands permits the teacher to perform operations at student workstations that are selected in the main control window. One example of a submenu for these types of commands is illustrated in FIG. 9. One of the commands on this submenu is for the function of opening a document on designated workstations. When this command is selected, a dialog box such as that illustrated in FIG. 10 is presented to the teacher. This box includes a pop-up window 80 which permits the teacher to identify the disk or other storage medium on which the desired document is located. After typing at least part of the name of the document, the disk is searched to locate files that contain the target string typed by the teacher. This searching is carried out at the teacher's workstation. When the searching is completed, items which match the search criteria are displayed in a window 82. If an item in this list is selected, information about that item is displayed in an information area 84 at the bottom of the dialog box. This information contains data that is appropriate for locating the file at the designated students' workstations. For example, this information can include the name of the file, its location, its type or kind, the author, date and time of creation or modification, and, if the selected item is a data file, an icon or the like which identifies the application program that created the file.

An open button 85 is clicked to indicate that the selected document should be opened on the designated workstations, at which point information about the selected item is sent to the designated machines. This information can include not only the name of the file, but other identifying data such as the date and/or time it was last modified, its size, the creator, and the like. Thus, if more than one file of the same name is stored on the student's hard disk, e.g. in separate folders or directories, they can be distinguished from one another with this additional information. Upon receiving this information, each of the workstations initiates a search to locate the file. If the file is found, an attempt is made to open it. If the file is an application, it is launched. Otherwise, if the file is a document, a search is conducted for the application associated with that document and that application is launched along with the document, if it is not already running.

As can be seen, this command can be used to launch applications as well as open documents. If desired, a separate command can also be provided in the submenu of FIG. 9 that specifically relates to the launching of applications on workstations. Similarly, a command can be provided to quit selected applications on designated workstations.

Figure 11:
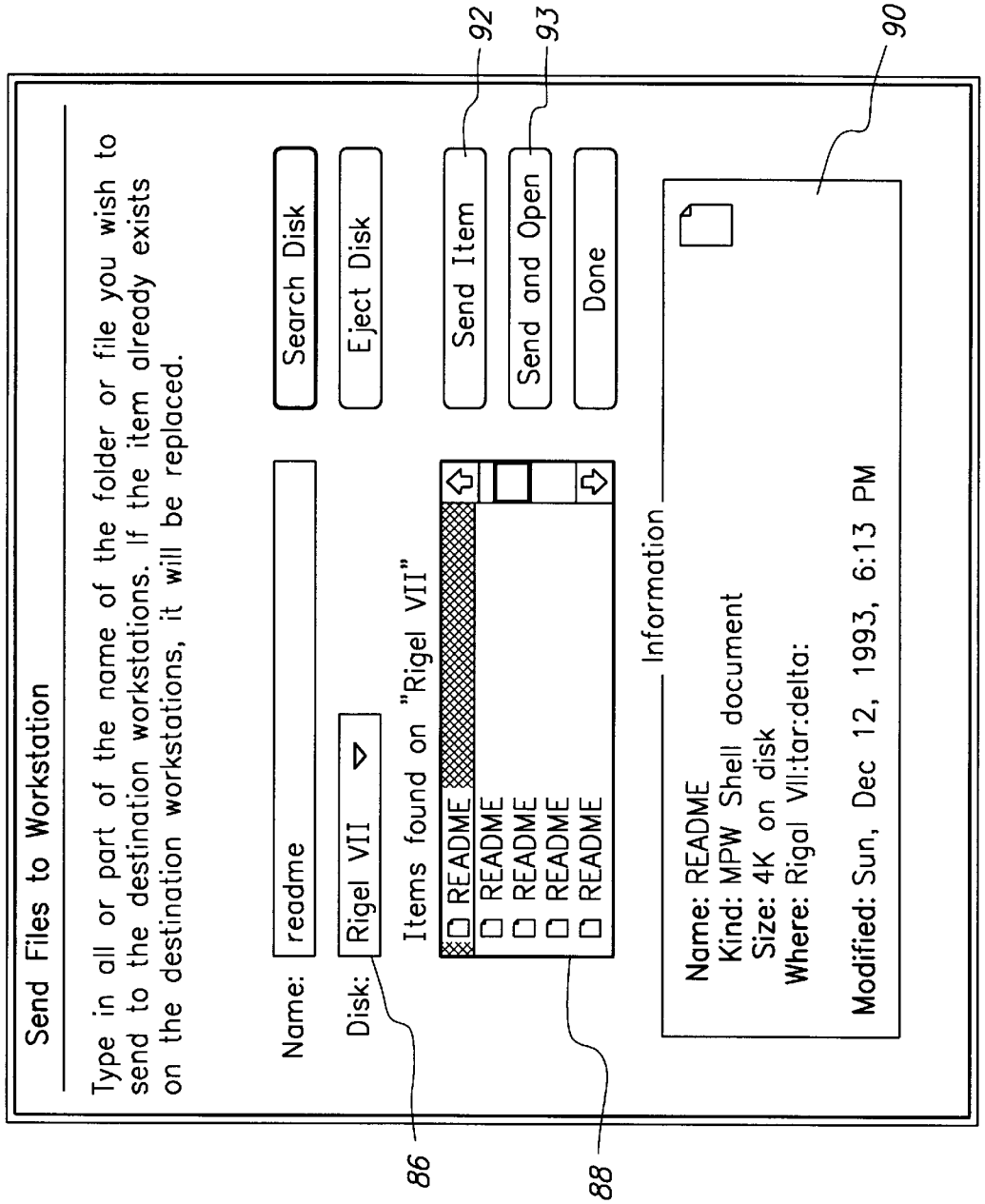
FIG. 11 is an illustration of a dialog box for the send files function.

The command to open a document on a workstation operates on the assumption that the selected document is stored on the local storage medium of each of the designated workstations. In the event that the document is not already present at the designated workstations, the submenu of FIG. 9 provides the teacher with a command to send files to workstations. If this command is selected, a dialog box such as that shown in FIG. 11 is presented to the teacher. As can be seen, this dialog box is similar to that used for opening documents on a workstation. Using a pop-up menu 86, the teacher designates the disk or other storage medium at his or her workstation on which the desired file is located, and then types at least a portion of the name of the file or folder to be transferred to the destination workstations. Items which match the search criteria are displayed in a window 88, and information about a selected item in this window is displayed in an information area 90.

After selecting the appropriate item or items to be sent, the teacher can actuate a send button 92. In response thereto, the teacher's workstation computes the amount of storage space required for the selected items, and sends this information to the destination workstations. The destination workstations determine whether there is sufficient space available in their storage media to store these items. If so, they instruct the master workstation to initiate a transfer, in which case the selected items are broadcast to the destination workstations.

At the destination workstations, the files are initially transferred to a predetermined folder, e.g. a designated transfer folder. After the transfer is completed, the files are moved to appropriate places within the storage media of the destination workstations. If the files have special attributes, for example those that are associated with operating system software, they are transferred to the required folders or directories in the storage media of the destination workstations. If the files do not have any special attributes, they are placed in the same relative location on the destination workstations as they were on the source workstation. For example, if the hard disk at the teacher's workstation is labeled "RigelVII", a selected file might have a full path name of "RigelVII:tar:delta:Readme", on a student machine with a hard disk labeled "Student Hard Disk", the file location of the file would be "StudentHardDisk:tar:delta:Readme". This would occur even if the destination workstation has to create folders or directories labeled "tar" and "delta". From this location, the document can then be opened, using the open document command described previously.

Alternatively, the teacher can send a document and then have it opened on the student's workstation in a single action, by actuating a "Send and Open" button 93 on the dialog box of FIG. 11. When this button is actuated, the file is sent to the students' workstations, as described previously, and then immediately opened. Thus, a teacher is able to create a document at his or her workstation, broadcast it to all of the students' workstations, and then launch that document at their workstations. In this manner, the teacher can reset an entire computer laboratory for the beginning of a class, or the like.

Figure 12A:
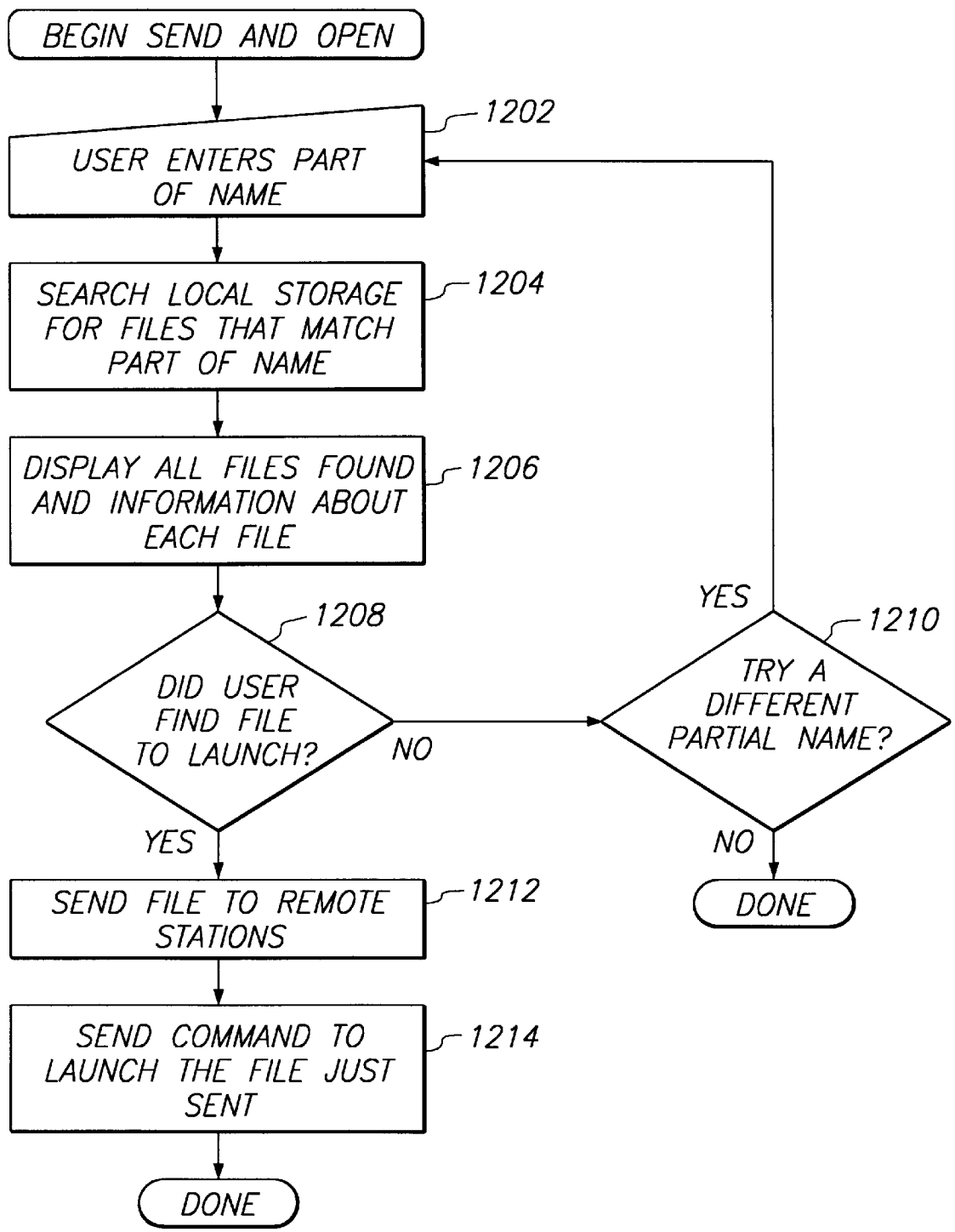
FIG. 12A is a flowchart of the send and open function.
Figure 12B:
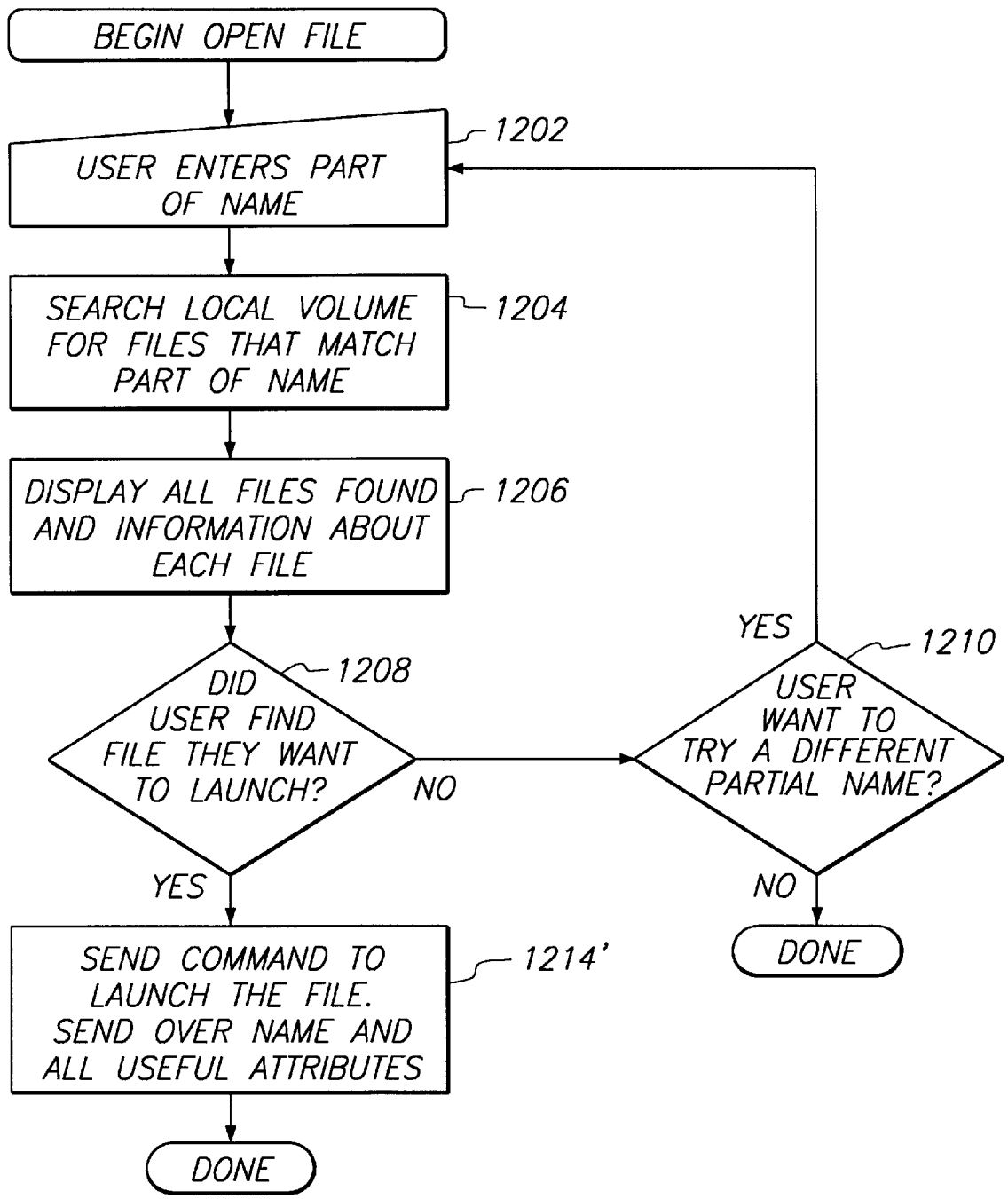
FIG. 12B is a flowchart of the open file function.
Figure 13:
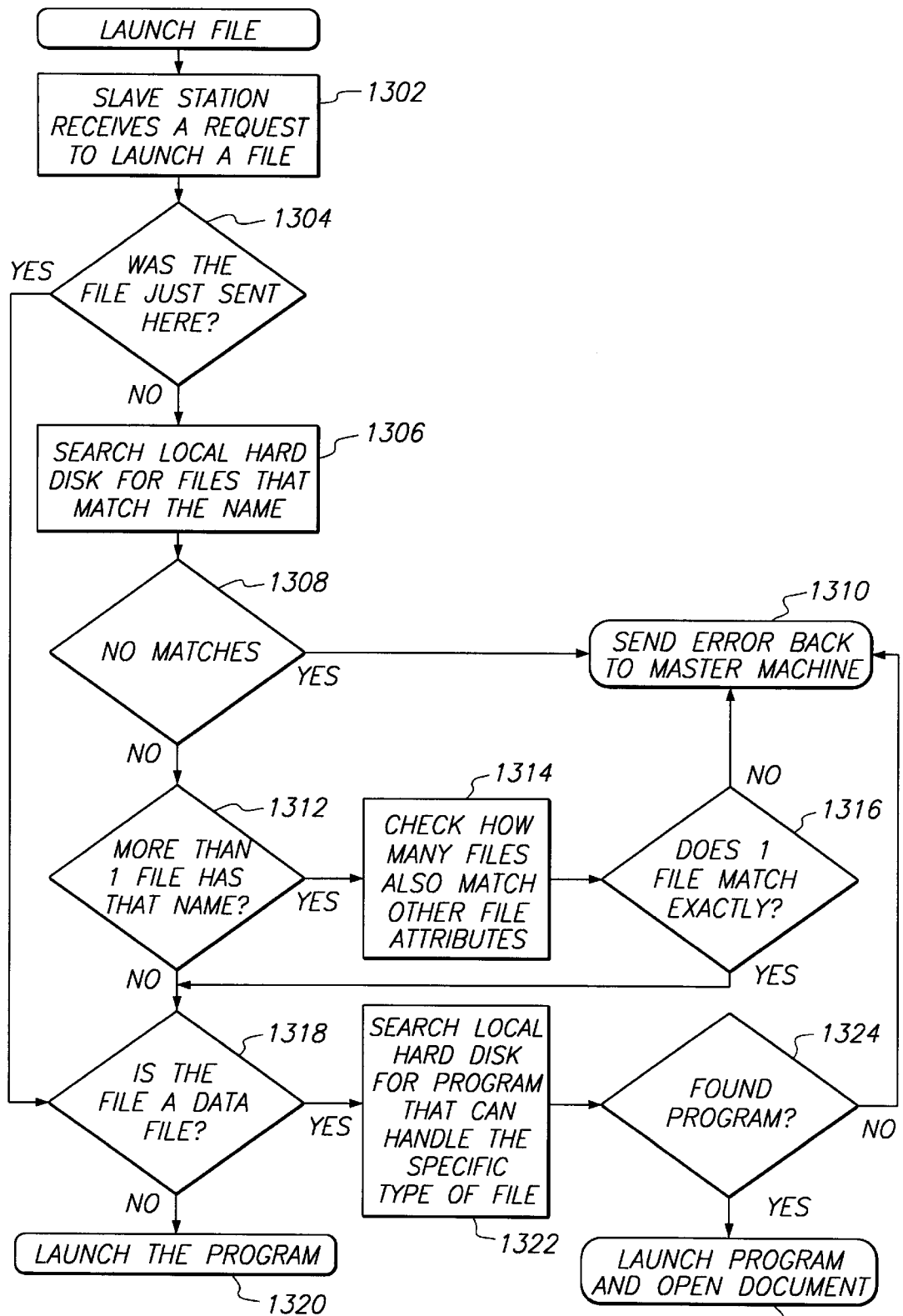
FIG. 13 is a flowchart of the launch file operation performed at the student workstations.

Flowcharts which illustrate the operations associated with sending and launching a file are shown in FIGS. 12A, 12B and 13. Referring to FIG. 12A, after issuing the command to launch a file, the teacher enters part of the name of the file (Step 1202). A search is carried out for files whose names correspond with the entered information (Step 1204), and all files which match the search criteria are displayed (Step 1206). A check is made to determine whether the teacher selects at least one of the files, and if not the teacher is given an opportunity to enter a different file name (Steps 1208 and 1210).

Once a file has been designated, it is sent to the destination workstations (Step 1212). A command to launch that file is then sent at Step 1214.

FIG. 12B illustrates the operation that is performed when a command is sent to launch a file, from the dialog box of FIG. 10. Essentially the same operations are performed as in the flowchart of FIG. 12A, except that the file is not initially sent to the workstations, i.e. Step 1212 is omitted. In addition, when the command to launch a file is transmitted to the workstation, it is accompanied by the relevant attribute information that enables the proper file to be readily identified at the students' workstations (Step 1214').

The flowchart of FIG. 13 depicts the operations that are carried out at the students' workstations in response to a command to launch a file. After receiving the command at Step 1302, the workstation determines whether the file was just sent from the master workstation (Step 1304). For example, this information can be present in the command sent from the master workstation at Step 1214. If the file was just sent, a determination is made at Step 1318 whether it is a data file. If not, it is considered to be a program file, and the program is launched at Step 1320. If the file is a data file, a search is carried out at Steps 1322 and 1324 to determine whether a program that can handle the data file is present. If so, the program is launched at Step 1326. Otherwise, an error message is sent to the master workstation at Step 1310.

If the file to be opened was not just sent from the master workstation, as determined at Step 1304, a search for the file is conducted on the local storage media at Step 1306. If it cannot be found, an error message is sent to the master workstation at Step 1310. If a file which has the designated name is found, a determination is made at Step 1312 whether more than one file with that name is present. If so, the other file attributes are checked at Steps 1314 and 1316 to see if only one of the located files matches them. If not, an error message is returned to the master workstation. Otherwise, the process proceeds to Step 1318, and continues as described previously.

Figure 14:
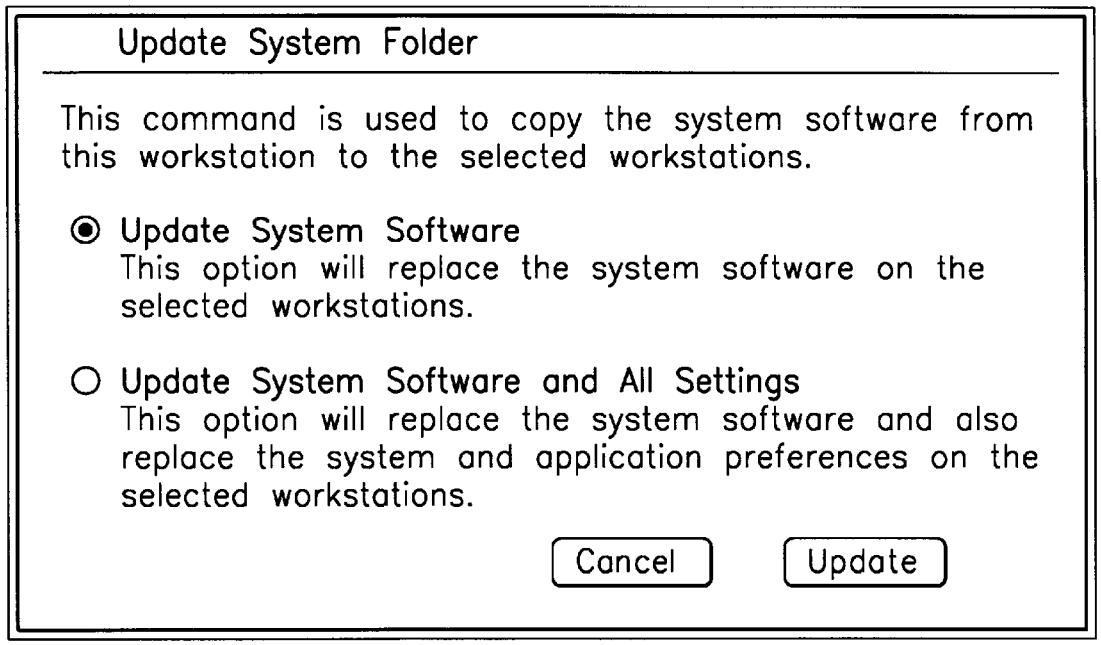
FIG. 14 is an illustration of a dialog box for the update system folder function.

Another command that is available on the submenu of FIG. 9 is one to update a system folder. This command allows the teacher to quickly replace system software on designated workstations with updated or new system software located at the teacher's workstation, and thereby avoid the need to physically install the system software at each individual workstation. When this command is selected, a dialog box such as that shown in FIG. 14 is presented to the teacher. This dialog box provides a choice of two options in the updating of the system software. If the first option, "Update System Software", is chosen, a normal installation of the system software takes place, but few, if any, of the user designated system settings or application preferences are affected. Thus, if the student has designated a particular printer or set certain colors for elements in the display, those choices will be saved. The second option, "Update System Software And All Settings", causes all system settings and application preferences to be copied from the teacher's workstation to the destination workstations, as well as installation of the system software itself. In this case, the student's workstations will be configured like the teacher's.

In the implementation of this function, all of the files to be loaded onto the students' workstations are first transferred to a predetermined folder or directory at the destination machines, e.g. a file transfer folder. After the transfer is complete, the identification of the designated workstation, for example the name by which it is identified on the network, is copied to the new system software. Any machine-dependent items of software that are in the old system software but not in the new system software are also copied into the new system software folder, so that users will not create a non-bootable system. Similarly, preferences in settings that are not to be updated are copied from the old system folder into the appropriate location in the new system folder, such as a preferences folder associated with the new system software. An empty file is created in the file transfer folder with a name containing the directory identification of the old system folder. Finally, the system configuration information on the disk is changed to point to the new system folder, and the workstation is restarted.

Upon restart, the system recognizes that the system software folder is now in the file transfer folder, and therefore must have been updated. In response, the old system folder is deleted, and the new system folder is moved to the root directory on the disk. The empty file with the directory identification of the old system is then deleted. In this manner, the teacher can update system software and user preferences directly from his or her workstation, and thereby reconfigure any or all of the student's workstations in an easy and effective manner.

Figure 15:
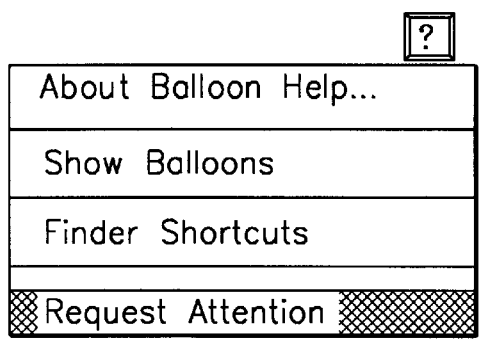
FIG. 15 is an illustration of the help menu displayed at the student workstations.

Each of the students' workstations 12 is provided with a help menu that enables the students to obtain assistance in the operation of their computers. An example of a help menu is illustrated in FIG. 15. One of the items in this menu permits the student to request attention from the teacher. When the student selects this item, a request for help is included in the status information that is sent from the student's workstation to the teacher's workstation over the digital data network 14.

Figure 16:
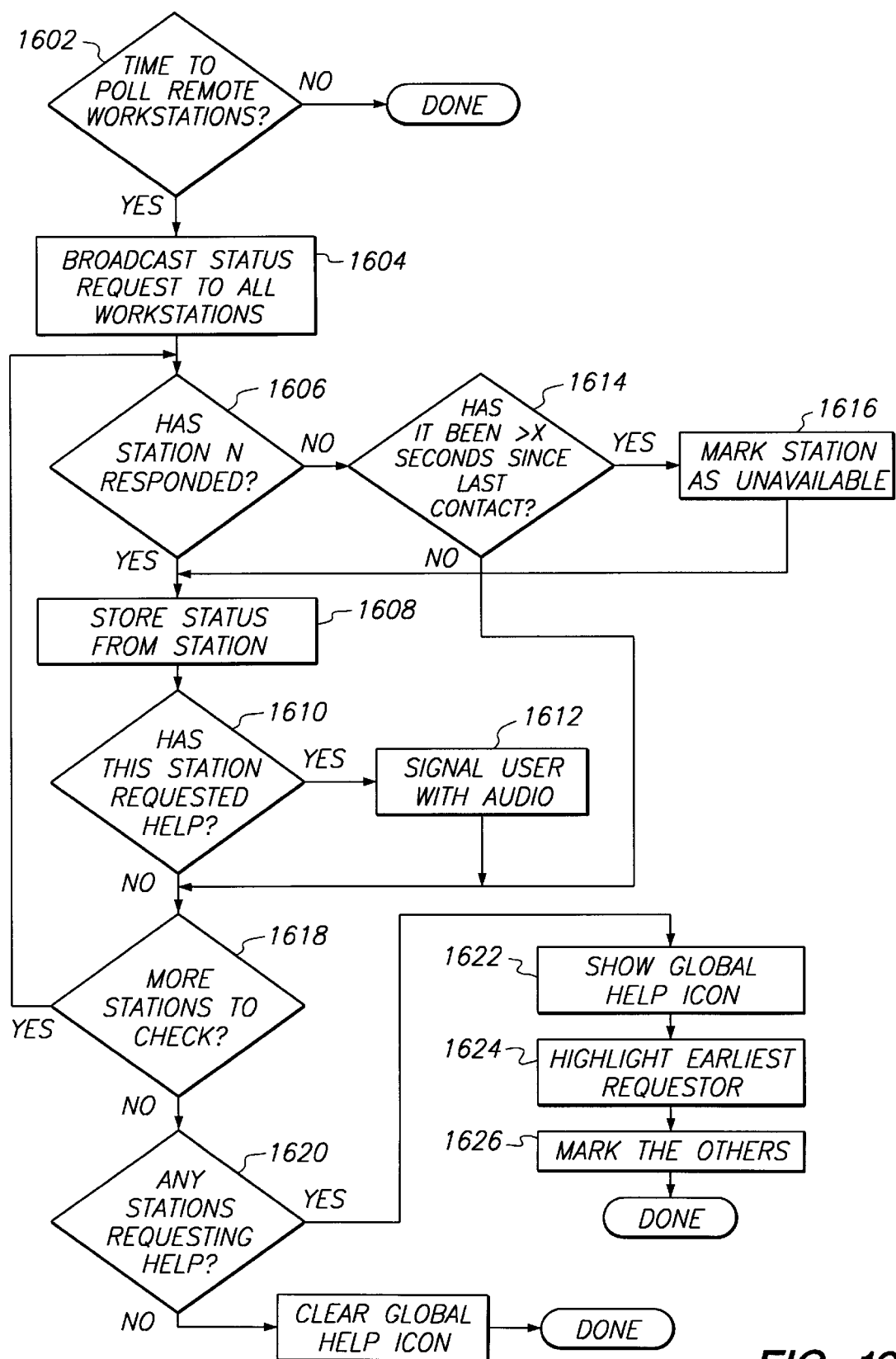
FIG. 16 is a flowchart of the status update function performed at the master workstation.

In the overall operation of the network, the master workstation 10 periodically polls the students' workstations to obtain status information. This operation is depicted in the flowchart of FIG. 16. Referring thereto, when a determination is made at Step 1602 that a timer has timed out, a status request is broadcast to the students' workstations at Step 1604. A check is made at Step 1606 to determine whether a particular workstation has responded, and if so its status information is stored at Step 1608, for display on the main control window. In addition, a determination is made at Step 1610 whether the workstation has requested attention, and if so an audible indicator is sounded at Step 1612.

If a particular workstation being polled has not responded to the status request, a second timer is checked at Step 1614. If the timer has not yet timed out, the process continues. If the timer has timed out, however, and the workstation has not responded, that workstation is marked as unavailable at Step 1616.

The process continues in this manner until all of the workstations on the network have been checked for their status (Step 1618). Proceeding then to Step 1620, the process determines if any of the polled stations included a request for help in their status information. If so, a global help icon is displayed on the teacher's screen (Step 1622).

Figure 17:
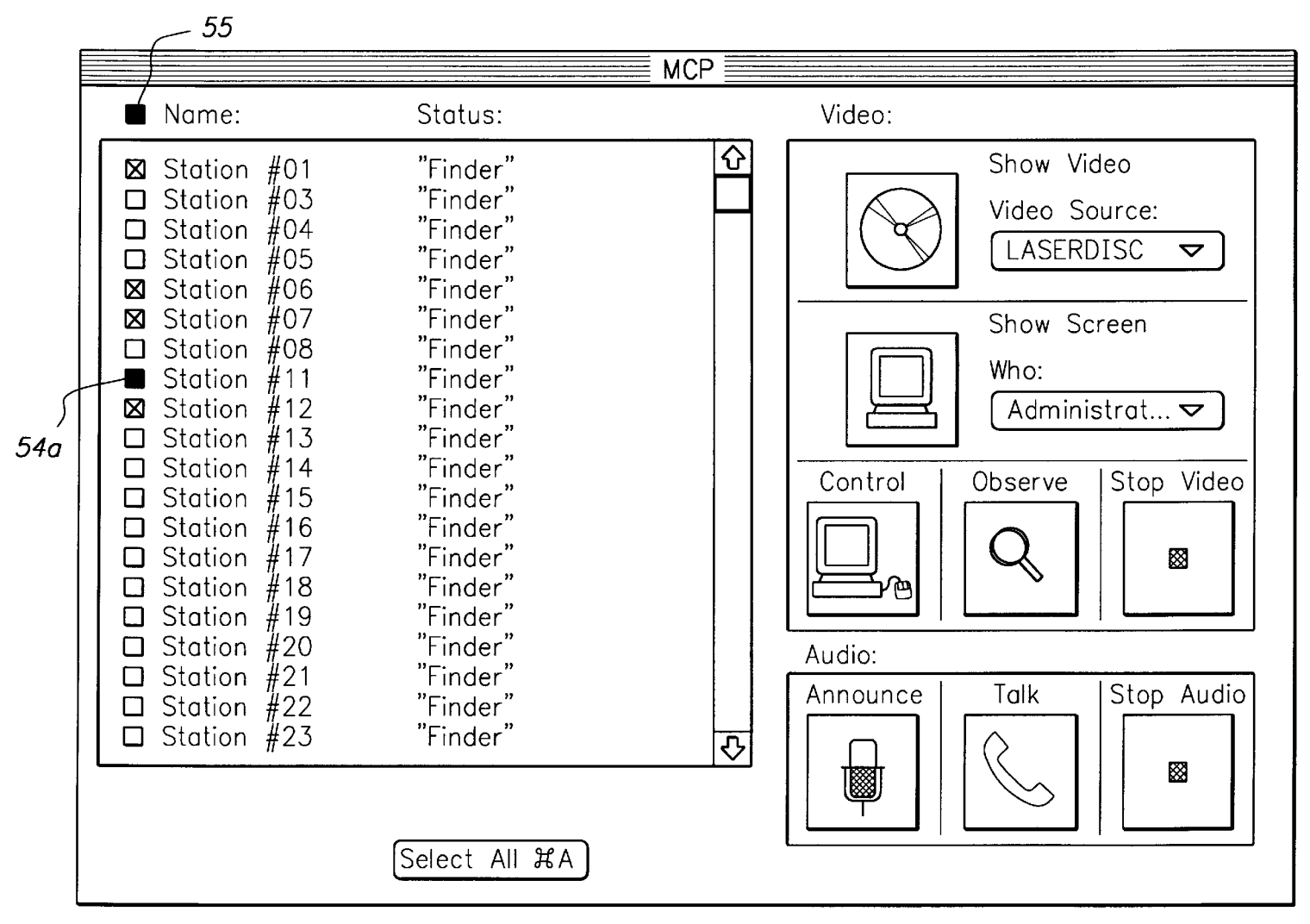

In response to a request for assistance, the indicator box 54 adjacent the name of each workstation that requested assistance is highlighted in the main control window, or otherwise marked, as shown in FIG. 17. In addition, the global help icon 55 is highlighted. This icon informs the teacher that a request for attention is pending, even if the teacher has scrolled the main window such that the name and indicator box of the workstation requesting help is not currently visible. When a request is received at the teacher's workstation 10, an audible indicator can also be provided, in the event that the teacher is currently observing or controlling another student's workstation and therefore not viewing the main control window. FIG. 17 illustrates an example in which five indicator boxes are highlighted, to identify the fact that five students have requested attention. When two or more requests for attention are pending, they are prioritized in order of receipt. The oldest pending request is highlighted in a different manner from all other pending requests (Step 1624). For example, the indicator box 54*a* for the oldest pending request might be colored red. The indicator boxes for other workstations with pending requests are marked in another manner (Step 1626). For instance, they can be colored green to indicate that requests are pending but not of the highest priority, or checked as shown in FIG. 17. The indicator boxes for workstations with no pending requests are left blank, i.e. the background color.

In response to a request for attention, the teacher can select the workstation of the oldest pending request, and then actuate the talk button 62 to initiate a two-way conversation with the student who requested attention. Since the teacher is interacting with the student, it is assumed that the request for attention is being responded to. Therefore, the request for that particular workstation can be cleared.

Figure 18:
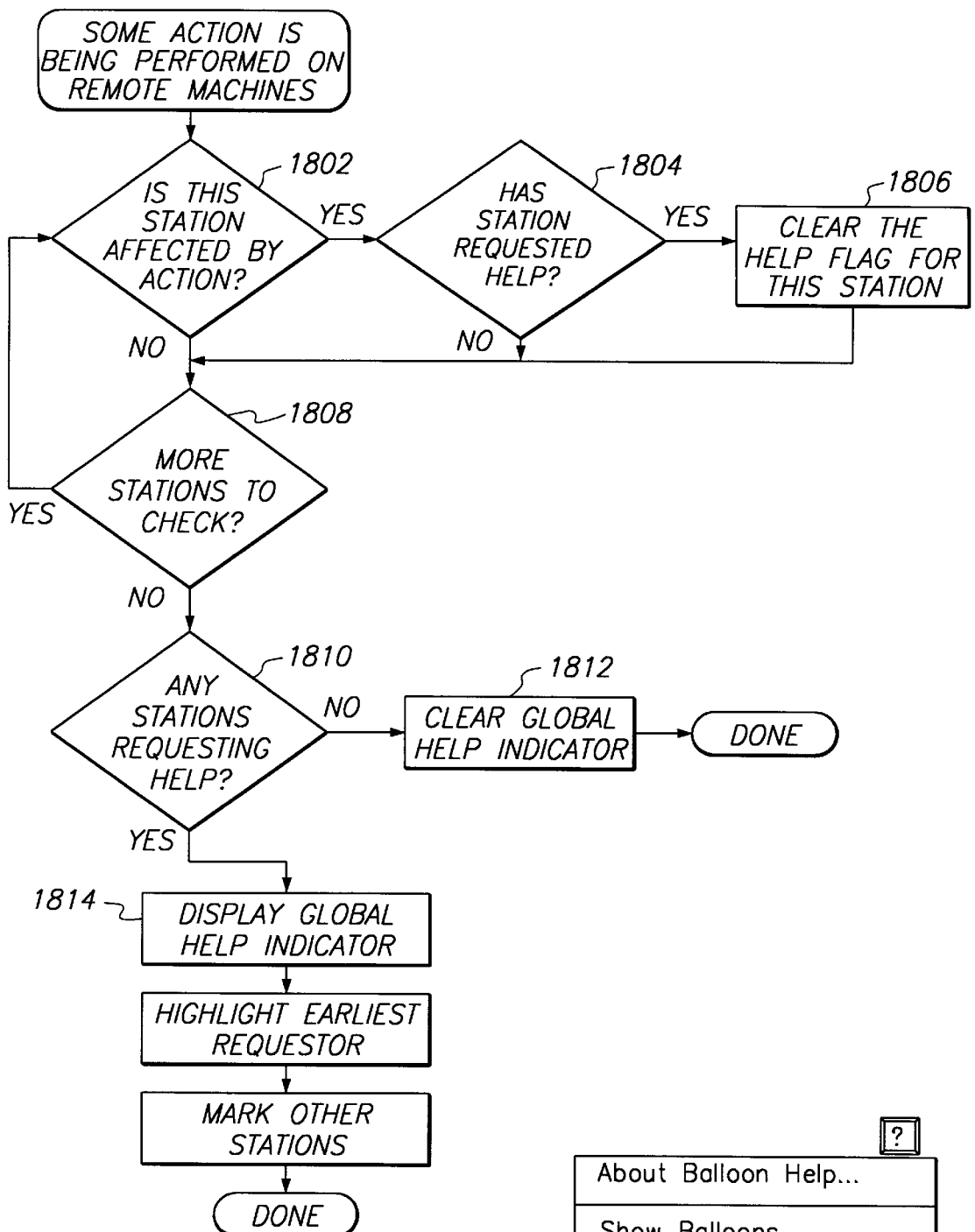
FIG. 18 is a flowchart of the routine for cancelling a pending request for attention.

A flowchart for carrying out this function is illustrated in FIG. 18. The process depicted in this flowchart is called any time some action is being performed at any of the student's machines. These actions can include the talk, announce and control operations, for example. While the action is being performed, each student workstation is examined to determine whether the action has some affect upon it (Step 1802). If the workstation is affected, for example, the teacher is talking to the student at that workstation, the system determines whether that workstation has requested help (Step 1804). If so, the help flag for that station is cleared at Step 1806.

After all of the student workstations have been examined in this manner (Step 1808), a determination is made whether any of the student workstations still has a pending request for help. If not, the global help indicator is cleared at Step 1812. If a request is pending, the global help indicator is displayed at Step 1814, and the list of requests is sorted to locate the earliest one. The earliest pending request is highlighted on the teacher's main control window, and all other pending requests are suitably marked, as described previously.

Figure 19:
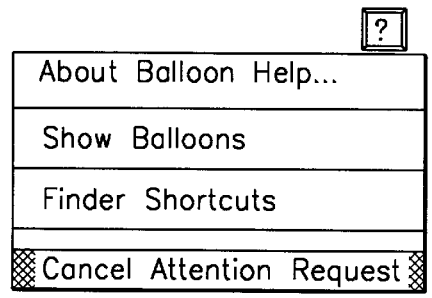
FIG. 19 is an illustration of the help menu that is displayed while a request for attention is pending.

In addition to clearing requests through interaction with a student's workstation, they can be manually cleared by either the student or the teacher. While a student has a request for attention pending, his or her help menu is modified to present a command which enables him or her to cancel that request. An example of the modified help menu is illustrated in FIG. 19. If the cancel attention request command is selected, the request is cleared at the teacher's workstation 12. Similarly, the teacher can clear the request through selection of a command on the submenu illustrated in FIG. 9.

From the foregoing, it can be seen that the present invention provides a number of features which facilitate supervision and control of networked multimedia workstations. Although specifically described in the context of a system employed within a classroom or computer laboratory setting, it can be seen that the features of the invention have applicability in a much larger variety of network environments. Furthermore, it is not necessary that there be only one master workstation on the network. Rather, multiple master workstations are feasible, and individual workstations can function as both a master workstation and as a slave workstation for another master workstation on the network.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. In a networked computer system having at least one control workstation and a multiplicity of other workstations, each having an associated display device for displaying information being processed at the respective workstations, a method for displaying information from the display devices of a plurality of said other workstations on the display device of said control workstation, comprising the steps of:

generating a command to said plurality of other workstations to provide to the control workstation display information;

processing the information being displayed on the display devices at each of said plurality of other workstations to produce data relating to a reduced-size reproduction of the information being displayed;

transmitting said reduced-size reproduction data to said control workstation;

storing the reduced-size reproduction data received from each of said plurality of other workstations at said control workstation; and simultaneously displaying a reduced-size reproduction of the information displayed at each of said other workstations at respective locations on the display device for said control workstation.

2. The method of claim 1 wherein said processing step performed at each of said other workstations includes grouping a predetermined number of pixels of the display device for the workstation, determining color component values for each pixel in a group, determining a representative color component value for all of the pixels in the group, and storing said representative color component value as a lesser number of pixel values in said reduced-size reproduction data.

3. The method of claim 2 wherein said representative color component value is determined by means of a linear decimation of the color component values for the pixels in the group.

4. The method of claim 2 wherein said predetermined number is four and said lesser number is one.

5. The method of claim 2 wherein said color component values respectively pertain to primary colors.

6. The method of claim 1 wherein the number of reduced-size reproductions that are simultaneously displayed on the control workstation's display device is N, and wherein information for a number of other workstations greater than N is displayed through the further steps of:

simultaneously displaying reduced-size reproductions of the information displayed at a first group of N other workstations for a predetermined period of time;

detecting the end of said period of time;

generating a command to a new group of N or fewer other workstations to provide display information; and displaying on the display device of said control workstation reduced-size reproductions of the information received from the other workstations in said new group for said predetermined period of time.

7. The method of claim 1 further including the steps of:

selecting one of the reduced-size reproductions displayed at said control workstation;

transmitting a command from said control workstation to the other workstation associated with the selected reproduction to transmit full-size screen information;

transmitting full-size screen information from said other workstation to said control workstation; and displaying at said control workstation a full-size reproduction of the information displayed at said other workstation.

8. The method of claim 7 further including the step of controlling the operation of said other workstation from said control workstation while said full-size reproduction is displayed.

9. The method of claim 1 further including the steps of transmitting information from said plurality of other workstations to said control workstation which indicates a current status of each of said other workstations, and displaying status information and an identification of said other workstation together with the reduced-size reproduction of said other workstation's display.

10. The method of claim 9 wherein said status information includes an identification of an application program currently running on an other workstation where the information displayed on said other workstation's display device is reproduced at said control workstation.

11. The method of claim 1 wherein the number of reduced-size reproductions that are simultaneously displayed on the control workstation's display device is N, and wherein a number of other workstations greater than N are displayed on the control workstation's display device through the further steps of:

simultaneously displaying reduced-size reproductions of the information displayed at a first group of N other workstations for a predetermined period of time;

terminating display of said first group of N other workstations; and displaying on the control workstation's display device reduced-size reproductions of the information received from other workstations in a new group of N or fewer other workstations.

12. The method of claim 11, further including the step of periodically cycling through each group of other workstations to display reduced-size reproductions of the display information for each workstation in a group for said predetermined period of time.

13. The method of claim 1 further comprising the steps of:

determining what information relating to an other workstation's display has changed;

transmitting display change information relating to the changes in the other workstation's display to the control workstation; and updating the control workstation display with said changed display information.

14. The method of claim 1 wherein the information displayed on the display device of said other workstation is reproduced at one fourth its original size when displayed on the master workstation display.

15. The method of claim 1 wherein a size reduction of the information displayed on the display device of the other workstation is performed by a 4:1 compression technique.

16. The method of claim 1 wherein said reduced size reproduction of an other workstation that is displayed on the display device for said control workstation comprises substantially the entirety of the information displayed on the display device for said other workstation.

17. The method of claim 1, wherein the information displayed at the display devices of said other workstations is reduced by a factor of N:1, and wherein N reduced-size reproductions are displayed on the display device for the control workstation at one time.

18. The method of claim 17 wherein said reduced-size reproductions occupy substantially the entire display area of the display device for the control workstation.

19. A control system for reproducing output displays in an interactive networked computer learning environment, comprising:

at least one control workstation having a display device;

a plurality of other workstations each having an associated display device;

a networking system for sharing data between said control workstation and said other workstations;

a means for generating a command to said plurality of other workstations to provide data to the control workstation relating to a reduced-size reproduction of the display on their display devices;

a means for transmitting said reduced-size reproduction data from said other workstations to said control workstation;

a means for storing said reduced-size reproduction data at said control workstation; and a means for displaying multiple reduced-size reproductions of the information displayed at the display devices of said other workstations at respective locations on the display device for said control workstation.

20. The control system of claim 19 wherein said reduced size reproduction of an other workstation that is displayed on the display device for said control workstation comprises substantially the entirety of the information displayed on the display device for said other workstation.

21. The control system of claim 19 wherein the information displayed at the display devices of said other workstations is reduced by a factor of N:1, and wherein N reduced-size reproductions are displayed on the display device for the control workstation at one time.

22. The control system of claim 21 wherein said N reduced-size reproductions occupy substantially the entire display area of the display device for the control workstation.

23. A master workstation for use in an interactive networked computer learning environment, comprising:

a display device;

a means for generating a command to be sent to other workstations with display devices to process information on their display, said processed information relating to a reduced-size reproduction of the information displayed on the display device of said other workstation;

a means for generating a command to said other workstations to send processed information relating to a reduced-size reproduction to the master workstation;

a means for storing said processed information relating to a reduced-size reproduction at the master workstation; and a means for displaying on the master workstation display device the reduced-size reproduction of the information displayed at said other workstation.

24. A master workstation for use in an interactive networked computer learning environment as in claim 23, further comprising:

a means for simultaneously displaying at the master workstation display device a plurality of reduced-size reproductions from respective other workstations.

25. The master workstation of claim 24 wherein said plurality of reduced-size reproductions occupy substantially the entirety of the display area of the display device for said master workstation.

26. An interactive networked computer system for a learning environment, comprising:

at least one master workstation each including a CPU, a memory storage device, a display device, a user input device, and operational instructions stored within the memory storage device;

a plurality of other workstations each including a CPU, a memory storage device, a display device, a user input device, and operational instructions stored within the memory storage device;

a networking system for allowing information to be shared between said master workstation and said other workstations;

a means for generating a command to said plurality of other workstations to provide display information to said master workstation;

a display processor for processing information being displayed on the display devices at each of said plurality of other workstations to produce data relating to a reduced-size reproduction of the information being displayed;

a means for transmitting said reduced-size reproduction data to said master workstation;

a means for storing the reduced-size reproduction data received from each of said plurality of other workstations at the memory storage device of the master workstation; and a means for simultaneously displaying at the master workstation plural reduced-size reproductions of the information displayed at each of said other workstations.

27. An interactive networked computer system as in claim 26 wherein the area on the master workstation display device occupied by the reduced-size reproduction is one fourth the area occupied on the respective display device of said other workstation.

28. An interactive networked computer system as in claim 26 wherein the area occupied by the image formed by displaying the reduced-size reproduction on the display device of said master workstation is one fourth the area occupied by the image formed on the display device of the respective other workstation.

29. An interactive networked computer system as in claim 26, wherein said reduced size reproduction of an other workstation that is displayed on the display device for said master workstation comprises substantially the entirety of the information displayed on the display device for said other workstation.

30. An interactive networked computer system as in claim 26, further comprising:

a means for determining what display information has changed since the reduced-size reproduction was transmitted to the master workstation;

a means for transmitting to the master workstation changed display information;

a means for storing said changed display information at the master workstation; and a means for updating the display of the master workstation with said changed display information.

* * * * *